United States Patent
Matsumoto et al.

(10) Patent No.: US 10,701,222 B2
(45) Date of Patent: *Jun. 30, 2020

(54) IMAGE FORMING APPARATUS, IMAGE EDITING METHOD AND NON-TRANSITORY COMPUTER-READABLE RECORDING MEDIUM FOR FORMING AN IMAGE ON A RECORDING MEDIUM BASED ON AN IMAGE DISPLAYED ON A DISPLAY SECTION

(71) Applicant: Sharp Kabushiki Kaisha, Sakai, Osaka (JP)

(72) Inventors: Masanori Matsumoto, Sakai (JP); Takeshi Tani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,492

(22) Filed: May 15, 2019

(65) Prior Publication Data

US 2019/0268489 A1     Aug. 29, 2019

Related U.S. Application Data

(63) Continuation of application No. 16/006,940, filed on Jun. 13, 2018, now Pat. No. 10,341,510, which is a (Continued)

(30) Foreign Application Priority Data

Aug. 3, 2011 (JP) ................................ 2011-170411

(51) Int. Cl.
    *G06F 3/12*          (2006.01)
    *H04N 1/00*          (2006.01)
                        (Continued)

(52) U.S. Cl.
    CPC ....... *H04N 1/00395* (2013.01); *G06F 3/0483* (2013.01); *G06F 3/04845* (2013.01);
                      (Continued)

(58) Field of Classification Search
    CPC ........... H04N 1/00395; H04N 1/00381; H04N 1/00392; H04N 1/00411; H04N 1/0044;
                        (Continued)

(56) References Cited

U.S. PATENT DOCUMENTS

| | | | |
|---|---|---|---|
| 5,444,550 A * | 8/1995 | Enokida | .................... G06T 1/20 358/448 |
| 8,139,257 B2 * | 3/2012 | Fabrice | ............... G06F 3/04845 345/1.1 |

(Continued)

FOREIGN PATENT DOCUMENTS

JP       2002-202866 A     7/2002

OTHER PUBLICATIONS

Matsumoto et al., "Image Forming Apparatus, Image Editing Method and Non-Transitory Computer-Readable Recording Medium for Forming an Image on a Recording Medium Based on an Image Displayed on a Display Section", U.S. Appl. No. 16/006,940, filed Jun. 13, 2018.

*Primary Examiner* — Gabriel I Garcia
(74) *Attorney, Agent, or Firm* — Keating & Bennett, LLP

(57) ABSTRACT

An image processing method for processing a display image includes using an image forming apparatus which includes a position detector detecting a position of contact with a display screen and forms an image on a recording medium based on a display image displayed on the display screen. The display image includes an object image indicative of an object for an image formation and a medium image indicative of the recording medium, and the image processing method includes modifying magnification of the object (Continued)

US 10,701,222 B2
Page 2 image with respect to the medium image, without modifying the medium image, based on contact positions of two points detected by the position detector.

4 Claims, 17 Drawing Sheets

Related U.S. Application Data continuation of application No. 15/598,338, filed on May 18, 2017, now Pat. No. 10,051,140, which is a continuation of application No. 15/214,542, filed on Jul. 20, 2016, now Pat. No. 9,692,919, which is a continuation of application No. 14/575,326, filed on Dec. 18, 2014, now Pat. No. 9,432,533, which is a continuation of application No. 13/565,393, filed on Aug. 2, 2012, now Pat. No. 8,934,109.

(51) Int. Cl.
| | |
|---|---|
| *G06F 3/0483* | (2013.01) |
| *G06F 3/0488* | (2013.01) |
| *G06F 3/0484* | (2013.01) |
| *H04N 1/387* | (2006.01) |
| *H04N 1/393* | (2006.01) |

(52) U.S. Cl.
CPC ....... *G06F 3/04883* (2013.01); *H04N 1/0044* (2013.01); *H04N 1/00381* (2013.01); *H04N 1/00392* (2013.01); *H04N 1/00411* (2013.01); *H04N 1/00461* (2013.01); *H04N 1/00469* (2013.01); *H04N 1/00708* (2013.01); *H04N 1/3877* (2013.01); *H04N 1/393* (2013.01); *G06F 2203/04806* (2013.01); *G06F 2203/04808* (2013.01); *H04N 2201/0094* (2013.01)

(58) Field of Classification Search
CPC .......... H04N 1/00461; H04N 1/00469; H04N 1/00708; H04N 1/3877; H04N 1/393; H04N 2201/0094; G06F 3/0483; G06F 3/04883; G06F 2203/04806; G06F 2203/04808
USPC ................................ 358/1.1–1.18, 474, 486
See application file for complete search history.

(56) References Cited

U.S. PATENT DOCUMENTS

| | | | | |
|---|---|---|---|---|
| 8,266,529 | B2 * | 9/2012 | Ooi | G06F 3/03547 715/702 |
| 8,934,109 | B2 * | 1/2015 | Matsumoto | H04N 1/00708 358/1.13 |
| 10,341,510 | B2 * | 7/2019 | Matsumoto | H04N 1/00392 |
| 2006/0026536 | A1 * | 2/2006 | Hotelling | G06F 3/04883 715/863 |
| 2009/0201543 | A1 * | 8/2009 | Tonami | H04N 1/00432 358/1.15 |
| 2009/0237712 | A1 * | 9/2009 | Shirai | H04N 1/2384 358/1.15 |
| 2009/0265625 | A1 * | 10/2009 | Tamai | G06F 3/1207 715/274 |
| 2011/0043639 | A1 * | 2/2011 | Yokohata | H04N 5/2625 348/169 |

\* cited by examiner

F I G. 9

| SCALING FACTOR | BEFORE EDITING | AFTER EDITING |
|---|---|---|
| 141% | A4 | A3 |
|  | B5 | B4 |
| 122% | A4 | B4 |
| 115% | B5 | A4 |
|  | B4 | A3 |
| 100% |  |  |
| 86% | A4 | B5 |
|  | A3 | B4 |
| 81% | B4 | A4 |
| 70% | A3 | A4 |
|  | B4 | B5 |

IMAGE FORMING APPARATUS, IMAGE EDITING METHOD AND NON-TRANSITORY COMPUTER-READABLE RECORDING MEDIUM FOR FORMING AN IMAGE ON A RECORDING MEDIUM BASED ON AN IMAGE DISPLAYED ON A DISPLAY SECTION

CROSS-REFERENCE TO RELATED APPLICATIONS

This Nonprovisional application claims priority under 35 U.S.C. § 119(a) on Patent Application No. 2011-170411 filed in Japan on Aug. 3, 2011, the entire contents of which are hereby incorporated by reference.

FIELD

The present invention relates to: an image forming apparatus for forming an image on a sheet-like recording medium based on a display image displayed on a display section; an image editing method; and a non-transitory computer-readable recording medium in which a computer program is recorded.

BACKGROUND

In recent years, an electronic apparatus, in which a transparent touch panel, for example, is superimposed on a display section so that a touch operation performed on a display image displayed on the display section is detected to receive a given instruction, has been put into widespread use.

For example, Japanese Patent Application Laid-Open No. 2000-163031 discloses a portable information apparatus that displays a display image such as a map on a display section, and allows a user to touch the display image with his or her two fingers via a transparent touch panel so as to perform a so-called "pinch-in" or "pinch-out" operation for changing a distance between the two fingers, thus enabling enlargement/reduction of the display image.

SUMMARY

On the other hand, in editing a display image displayed on a display section, there is a demand for partial editing in which a part of the display image is edited. However, in order to perform such partial editing, a cumbersome operation for selecting a target part is required every time such partial editing is performed. The above-described portable information apparatus disclosed in Japanese Patent Application Laid-Open No. 2000-163031 does not have any contrivance to solve such a problem.

The present invention has been made in view of the above-described circumstances, and its object is to provide an image forming apparatus, an image editing method and a non-transitory computer-readable recording medium, which allow an editing target, included in a display image displayed on a display section, to be identified based on the direction of a straight line connecting two points detected by a position detecting section for detecting a position of contact with a display screen of the display section, and which allow partial editing to be performed on the target, thus making it possible to receive both of a target selection instruction and an editing instruction at the time in partial editing and to reduce user's time and effort.

A first aspect of the present invention provides an image forming apparatus that includes a display section, and a position detecting section for detecting a position of contact with a display screen of the display section, and that forms an image on a sheet-like recording medium based on a display image displayed on the display section, wherein the image forming apparatus includes an editing section for partially editing the display image based on the direction of a straight line connecting two points detected by the position detecting section.

In the first aspect of the present invention, upon detection of two points on the display screen by the position detecting section, the editing section edits a target in the display image, which is identified based on the direction of the straight line connecting the two points.

A second aspect of the present invention provides the image forming apparatus, wherein the display image includes: an object image indicative of an object for the image formation; and a medium image indicative of the recording medium, wherein the image forming apparatus includes a selection a receiving section for receiving selection of the object image and/or medium image based on the direction of the straight line, and wherein based on a result of the selection received by the selection receiving section, the editing section edits the object image and/or medium image.

In the second aspect of the present invention, upon reception of selection of the object image by the selection receiving section, the editing section edits the object image, and upon reception of selection of the medium image by the selection receiving section, the editing section edits the medium image. Further, upon reception of selection of the object image and medium image by the selection receiving section, the editing section edits both of the object image and medium image.

A third aspect of the present invention provides the image forming apparatus, wherein there are provided a plurality of types of recording media having different sizes, and wherein the image forming apparatus includes a medium deciding section for deciding, upon reception of selection of the medium image by the selection receiving section, the recording medium concerning the image formation based on a change in distance between the two points.

In the third aspect of the present invention, upon reception of selection of the medium image by the selection receiving section, the medium deciding section decides, from among the plurality of types of recording media, the recording medium for the image formation based on a change in distance between the two points, and the image formation is performed by using the decided recording medium.

A fourth aspect of the present invention provides the image forming apparatus, wherein there are provided a plurality of types of recording media having different sizes, wherein the image forming apparatus includes a medium deciding section concerning deciding the recording medium for the image formation based on a change in distance between the two points, and wherein upon reception of selection of the object image and medium image by the selection receiving section, the editing section edits the size of the object image based on the size of the recording medium decided by the medium deciding section.

In the fourth aspect of the present invention, upon reception of selection of the object image and medium image by the selection receiving section, the medium deciding section decides, from among the plurality of types of recording media, the recording medium concerning the image formation based on a change in distance between the two points, for example. Furthermore, in this case, the editing section edits the size of the object image based on the size of the recording medium decided by the medium deciding section. Based on the edited object image, an image is formed on the recording medium decided by the medium deciding section.

A fifth aspect of the present invention provides the image forming apparatus, wherein the image forming apparatus includes a display control section for displaying, on the display section, information concerning the recording medium decided by the medium deciding section.

In the fifth aspect of the present invention, when a given recording medium is decided by the medium deciding section, information concerning the decided recording medium is displayed on the display section.

A sixth aspect of the present invention provides the image forming apparatus, wherein when the direction of the straight line connecting the two points is changed due to a movement of one or both of the two points, the editing section performs, based on the change, editing for changing the orientation of the display image.

In the sixth aspect of the present invention, for example, when one or both of the two points is/are moved by a user and the direction of the straight line connecting the two points is thus changed, the editing section performs, based on the change in the direction of the straight line, editing for changing the orientation of the display image.

A seventh aspect of the present invention provides the image forming apparatus, wherein the selection receiving section receives a selection of the medium image when the direction of the straight line extends along one of two directions intersecting at a center of the display image, and wherein the selection receiving section receives a selection of the object image when the direction of the straight line extends along the other one of the two directions.

In the seventh aspect of the present invention, when the direction of the straight line extends along one of the two directions intersecting at the center of the display image, the selection receiving section receives a selection of the medium image, and the medium image is to be edited by the editing section. On the other hand, when the direction of the straight line extends along the other one of the two directions, the selection receiving section receives a selection of the object image, and the object image is to be edited by the editing section.

An eighth aspect of the present invention provides the image forming apparatus, wherein the selection receiving section receives a selection of the object image and medium image when the direction of the straight line extends along neither of the two directions.

In the eighth aspect of the present invention, when the direction of the straight line extends along neither of the two directions intersecting at the center of the display image, the selection receiving section receives a selection of the object image and medium image, and the object image and medium image are to be edited by the editing section.

A ninth aspect of the present invention provides an image editing method for editing a display image by using an image forming apparatus that includes a display section, and a position detecting section for detecting a position of contact with a display screen of the display section, and that forms an image on a sheet-like recording medium based on the display image displayed on the display section, wherein the image editing method includes a step of editing the display image based on the direction of a straight line connecting two points detected by the position detecting section.

A tenth aspect of the present invention provides a non-transitory computer-readable recording medium in which a computer program for causing a computer to edit a display image, the computer constituting an image forming apparatus that comprises a display section, and a position detecting section for detecting a position of contact with a display screen of the display section, and that forms an image on a sheet-like recording medium based on the display image displayed on the display section, is recorded and wherein the computer program causes the computer to execute a step of making the position detecting section to detect the position of contact and a step editing the display image based on the direction of a straight line connecting two points detected by the position detecting section.

In the ninth and tenth aspects of the present invention, upon detection of two points on the display screen by the position detecting section, the display image is edited based on the direction of the straight line connecting the two points.

In the tenth aspect of the present invention, the foregoing computer program is recorded in the non-transitory computer-readable recording medium. The computer reads the computer program from the non-transitory computer-readable recording medium, and the foregoing image forming apparatus and image editing method are implemented by the computer.

According to the present invention, an editing target in a display image displayed on the display section is identified based on the direction of a straight line connecting two points detected by the position detecting section, and the target is partially edited, thus making it possible to receive both of a target selection instruction and an editing instruction at the time in partial editing and to reduce user's time and effort.

The above and further objects and features will more fully be apparent from the following detailed description with accompanying drawings.

BRIEF DESCRIPTION OF THE DRAWINGS

FIG. 9 is a diagram illustrating an example of a correspondence table stored in a storage in a multi-function peripheral according to Embodiment 2 of the present invention.

DETAILED DESCRIPTION OF NON-LIMITING EXAMPLE EMBODIMENTS

Figure 1:
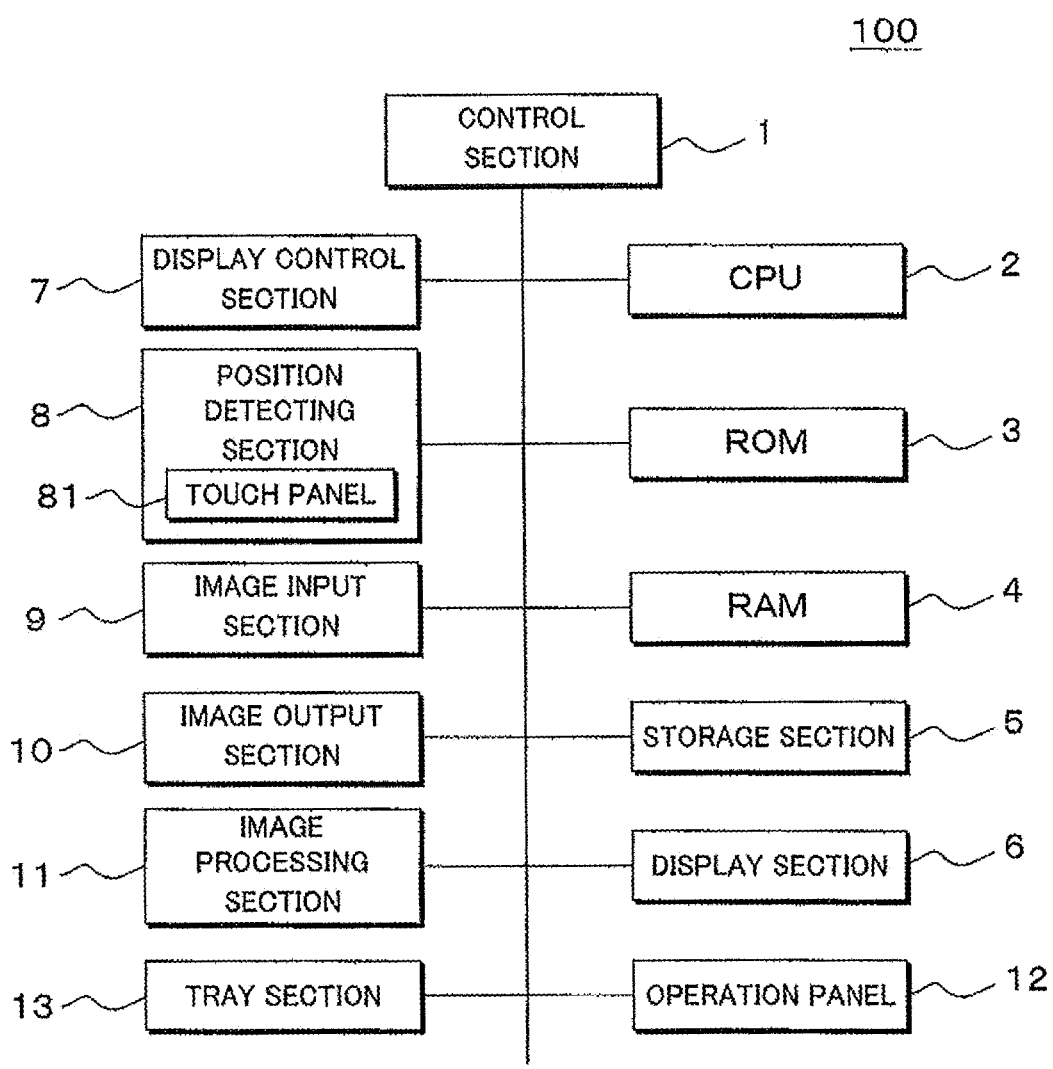
FIG. 1 is a block diagram illustrating main components of a multi-function peripheral according to Embodiment 1 of the present invention.

Referring to the drawings, the present invention will be described in detail using an example in which an image forming apparatus, an image editing method and a computer program according to embodiments of the present invention are applied to a multi-function peripheral 100 having a so-called "touch panel function".

Embodiment 1

FIG. 1 is a block diagram illustrating main components of the multi-function peripheral 100 according to Embodiment 1 of the present invention. The multi-function peripheral 100 includes: a controller 1; a CPU 2; a ROM 3; a RAM 4; a storage 5; a display section 6; a display controller 7; a position detecting section 8; an image input section 9; an image output section 10; an image processing section 11; an operation panel 12; and a tray section 13.

In the ROM 3, various control programs, fixed data of arithmetic parameters, etc. are basically stored in advance. The RAM 4 temporarily stores data, and allows the data to be read irrespective of a stored order, a stored position, etc. Further, the RAM 4 stores, for example, the program read from the ROM 3, various data generated by execution of the program, and a parameter that is appropriately changed at the time of execution of the program.

The CPU 2 loads the control programs, stored in advance in the ROM 3, into the RAM 4 and executes the control programs, thereby controlling various pieces of hardware mentioned above and allowing the entire apparatus to operate as the multi-function peripheral 100 of the present invention. Furthermore, the CPU 2 receives an instruction for a given process from a user via the position detecting section 8.

The storage 5 includes a nonvolatile non-transitory computer-readable storage medium such as a flash memory, an EEPROM, an HDD, an MRAM (magnetoresistive random-access memory), an FeRAM (ferroelectric random-access memory) or an OUM, for example.

The display section 6 includes an LCD or EL (Electroluminescence) panel, for example, and an image (display image) to be outputted (printed) via the image output section 10 on a given recording sheet is displayed on the display section 6. Further, the display section 6 displays information that should be provided to the user. The information includes: a state of the multi-function peripheral 100; a job processing status; a document image read by the image input section 9; and a confirmation of details of an operation performed on the operation panel 12. Furthermore, a display screen 61 of the display section 6 is covered with the position detecting section 8.

The display controller 7 includes a processor such as a DSP (Digital Signal Processor), and controls display of an image on the display section 6. For example, in response to an instruction from the CPU 2, the display controller 7 generates image data of an image to be displayed on the display section 6.

The position detecting section 8 has a touch panel 81, and the touch panel 81 is provided so as to cover the display screen 61 of the display section 6. Accordingly, the position detecting section 8 is capable of detecting a given position on the display screen 61 of the display section 6 in response to a touch operation performed by the user. The position detecting section 8 detects a change in pressure or an electrostatically-induced electric signal, caused by a touch operation performed by the user's fingertip(s), so that the position detecting section 8 detects coordinates on the display screen 61 of the display section 6, which correspond to contact position(s) of the user's fingertip(s), and generates signals that identify the coordinates. Moreover, the position detecting section 8 is not limited to the above-described structure but may be formed by using a pointing device (e.g., a stylus pen) or the like.

The image input section 9 includes a light source for applying light to a document to be read, and an image sensor such as a CCD (Charge Coupled Device), and optically reads image data of the document. Further, the image input section 9 allows the image sensor to form a reflected light image obtained from the document placed at a given read position, and outputs RGB (R: Red, G: Green, and B: Blue) analog data.

On a recording medium such as a recording sheet or an OHP film, the image output section 10 prints an image that is based on image data outputted from the image processing section 11. The image output section 10 includes: a photosensitive drum; a charging unit for charging the photosensitive drum to a given potential; a laser writing device for generating an electrostatic latent image on the photosensitive drum by emitting laser light in accordance with image data received from outside; a developing unit for performing development by supplying toner to the electrostatic latent image formed on a surface of the photosensitive drum; and a transfer unit for transferring a toner image, formed on the surface of the photosensitive drum, onto the recording medium. The image output section 10 outputs the image on the recording medium by electrophotography, for example.

The image processing section 11 generates digital image data based on the analog data inputted from the image input section 9, for example, or reads image data stored in the storage 5, and processes each image in accordance with its type; then, the image processing section 11 generates image data to be outputted (printed). The image data, which is generated by the image processing section 11 and to be outputted, is outputted to the image output section 10.

Furthermore, the operation panel 12 includes: function keys for allowing switching among functions such as "fax", "copying", "printing" and "mail" functions in the multi-function peripheral 100; a numeric keypad; a start key; a cancel key; an Enter key for confirming a received instruction; and an "output" or "copy" key for forming, on a sheet-like recording medium, a document image read via the image input section 9.

The tray section 13 has a plurality of trays (not illustrated), and the trays contain a plurality of types of recording sheets. More specifically, a plurality of types of standard sheets, having standard A4, A3, B4 and B5 sizes, for example, are contained in the corresponding trays. Moreover, each tray is provided with a tray sensor (not illustrated). The tray sensors are publicly known tray sensors for detecting whether or not the trays contain the sheets.

Using the above-described components, the multi-function peripheral 100 according to Embodiment 1 of the present invention receives, from the user, a touch operation performed on the display section 6, and edits an image displayed on the display section 6.

For example, the user touches the display screen 61 of the display section 6 (or the position detecting section 8) with his or her fingertip, and thus the position detecting section 8 receives a touch operation. In this case, the position detecting section 8 detects a position of a point at which the display screen 61 is touched, and sends a signal, which identifies coordinates of the point, to the CPU 2.

The CPU 2 acquires the signal (coordinates) from the position detecting section 8, and recognizes that a soft key, included in those displayed on the display section 6 and located at a position corresponding to the coordinates, has been operated.

On the other hand, for example, when the user touches the display screen 61 of the display section 6 (or the position detecting section 8) with his or her thumb and forefinger, the position detecting section 8 receives a touch operation for two points. In this case, the position detecting section 8 detects the position of a first point touched by the thumb and that of a second point touched by the forefinger, and sends a signal, which identifies coordinates of the two points, to the controller 1 and the CPU 2.

Subsequently, when the user performs a so-called "pinch-in" or "pinch-out" operation, a signal, which identifies the coordinates of the resulting two points, is further sent from the position detecting section 8 to the controller 1 and the CPU 2 in accordance with the operation. In this case, based on a positional relationship between the two points and a position change caused by the operation, i.e., a change in distance between the first and second points, the controller 1 and the CPU 2 receive an editing instruction for an image displayed on the display section 6.

For example, the controller 1 and the CPU 2 receive, based on the signal from the position detecting section 8, selection of an editing target concerning the editing instruction for the image in accordance with the direction of a straight line connecting the two points detected by the position detecting section 8. Further, based on a change in the distance between the first and second points, the controller 1 and the CPU 2 receive an editing instruction for enlarging or reducing the image.

Figure 2:
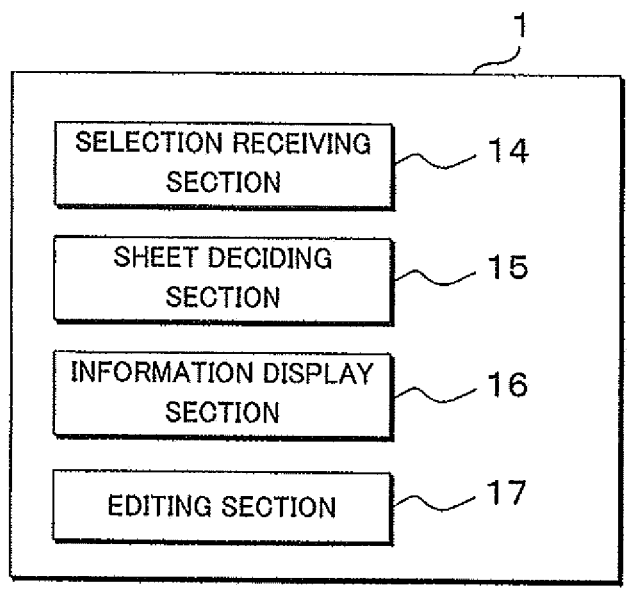
FIG. 2 is a functional block diagram illustrating main components of a controller in the multi-function peripheral according to Embodiment 1 of the present invention.

FIG. 2 is a functional block diagram illustrating main components of the controller 1 in the multi-function peripheral 100 according to Embodiment 1 of the present invention. The controller 1 includes: a selection receiving section 14; a sheet deciding section 15 (medium deciding section); an information display section 16; and an editing section 17.

Upon reception of a touch operation for two points from the user, the selection receiving section 14 receives, based on the signal emitted from the position detecting section 8, selection of an editing target for an image (display image), displayed on the display section 6 at this time, in accordance with the direction of a straight line connecting the two points. For example, the selection receiving section 14 receives the selection of the editing target in accordance with the direction of the straight line extending along either one of two directions intersecting at a center of the image displayed on the display section 6.

For example, the display section 6 displays an image (display image) including: an object image such as a picture, a graphic or a character, which is to be outputted via the image output section 10; and a sheet image (medium image) in which the object image is written and which is indicative of a recording sheet to be used at the time of output of the object image.

In this case, when a touch operation is performed on two points by the user, the selection receiving section 14 receives, based on the direction of a straight line connecting the two points, selection of the object image and/or sheet image as an editing target for the image (display image) displayed on the display section 6.

Upon reception of selection of the sheet image as the editing target by the selection receiving section 14, the sheet deciding section 15 decides a recording sheet to be used when the object image is actually outputted via the image output section 10.

More specifically, in the multi-function peripheral 100 according to Embodiment 1 of the present invention, a plurality of types of standard sheets, having standard A4, A3, B4 and B5 sizes, for example, are contained in the corresponding trays as mentioned above, and the sheet deciding section 15 selects, based on a change in the distance between the two points, the standard sheet contained in one of the trays. In the following description, standard sheets having A4, A3, B4 and B5 sizes will be referred to as "A4 sheet", "A3 sheet", "B4 sheet" and "B5 sheet", respectively.

For example, suppose that the distance between the two points is increased or reduced and the editing section 17 edits the size of the sheet image as described later. In that case, each time the distance is changed by 1 cm, the sheet deciding section 15 decides the sheet in the following order (or reverse order): A3 sheet, B4 sheet, A4 sheet and B5 sheet. For example, when the distance between the two points is increased by 1 cm, 2 cm, 3 cm and 4 cm or more, the sheet deciding section 15 selects, as the recording sheet, in the following order: B5 sheet, A4 sheet, B4 sheet and A3 sheet. On the other hand, when the distance between the two points is reduced by 1 cm, 2 cm, 3 cm and 4 cm or more, the sheet deciding section 15 selects, as the recording sheet, in the following order: A3 sheet, B4 sheet, A4 sheet and B5 sheet.

Via the display controller 7, the information display section 16 displays, on the display section 6, information concerning the sheet decided by the sheet deciding section 15. For example, the information display section 16 displays a text such as "A3 sheet", "B4 sheet" or "A4 sheet" on the display section 6, or displays a text such as "297 mm×420 mm", "257 mm×364 mm" or "210 mm×297 mm", indicating the size of the recording sheet, on the display section 6.

Furthermore, also when editing for enlarging/reducing the object image is performed by the editing section 17, the information display section 16 displays, on the display section 6, a scaling factor for enlargement/reduction of the object image.

Based on the direction of the straight line connecting the two points and a change in the distance between the two points, the editing section 17 partially or totally edits the image displayed on the display section 6. More specifically, for the image including the object image and sheet image as mentioned above, the editing section 17 performs partial editing for editing either one of the object image and sheet image, or total editing for editing both of the images concurrently.

For example, for the selected editing target received by the selection receiving section 14 based on the direction of the straight line connecting the two points, the editing section 17 performs partial editing for enlargement/reduction based on a change in the distance between the two points.

For example, the editing section 17 performs editing so that when the distance between the two points is increased, the object image or sheet image is increased by 1% each time the distance is increased by 1 mm, and when the distance between the two points is reduced, the object image or sheet image is reduced by 1% each time the distance is reduced by 1 mm.

Moreover, when the direction of the straight line connecting the two points is rotated and changed due to movement of one or both of the two points by the user, the CPU 2 receives this change as a rotation instruction for rotating the orientation of the image displayed on the display section 6. Further, based on this change, the editing section 17 performs editing (total editing) for rotating the orientation of the image displayed on the display section 6. For example, when the direction of the straight line is rotated in a clockwise direction, the editing section 17 performs editing for rotating the image in the clockwise direction.

Based on data concerning the image edited by the editing section 17 as described above, the display controller 7 displays the edited object image or sheet image on the display section 6.

Note that the selection receiving section 14, the sheet deciding section 15, the information display section 16 and the editing section 17 may be implemented by hardware logic, or may be implemented by software by using the CPU.

Figure 3:
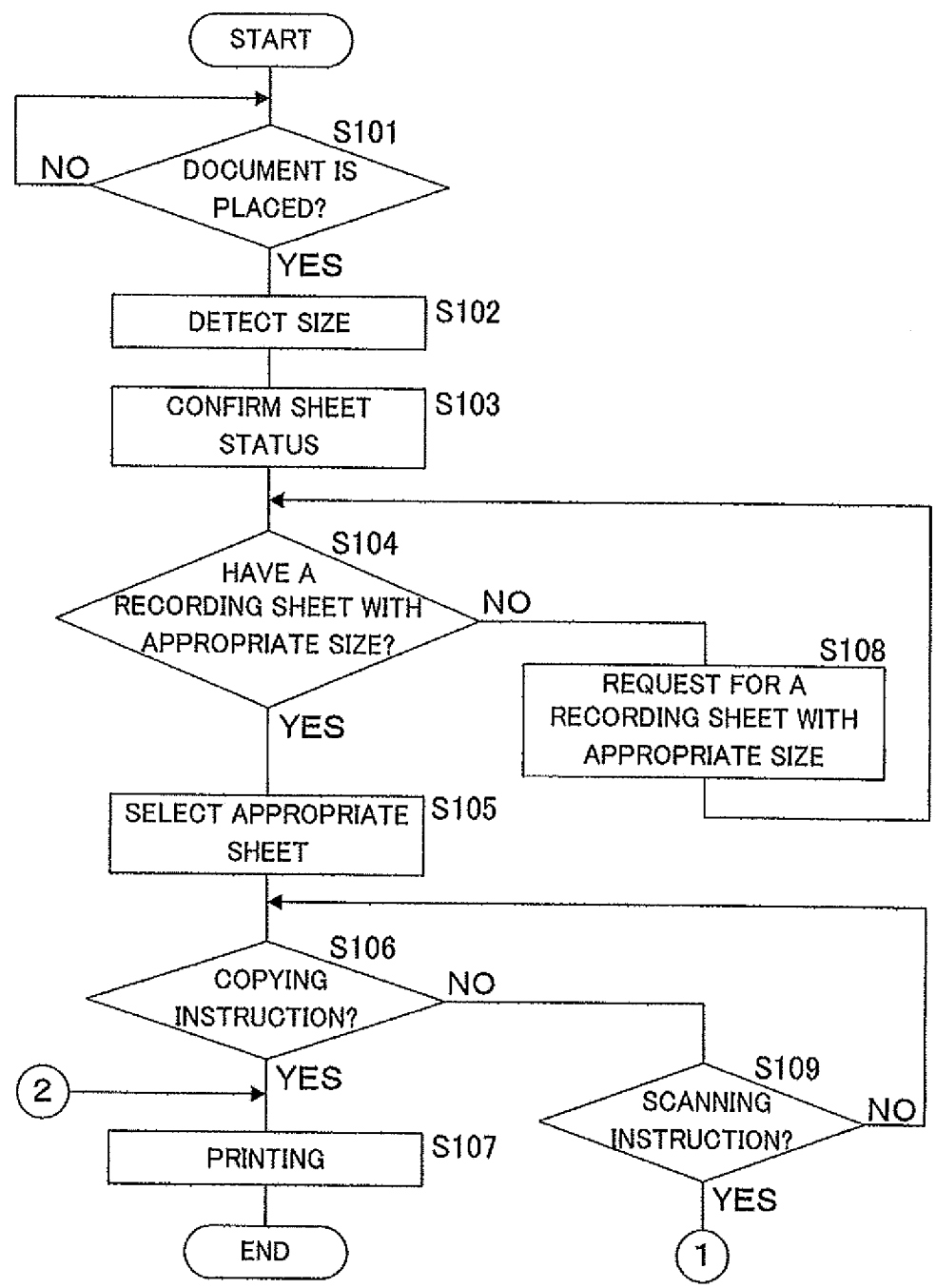
FIG. 3 is a flow chart for describing image editing processing performed in the multi-function peripheral according to Embodiment 1 of the present invention.
Figure 4:
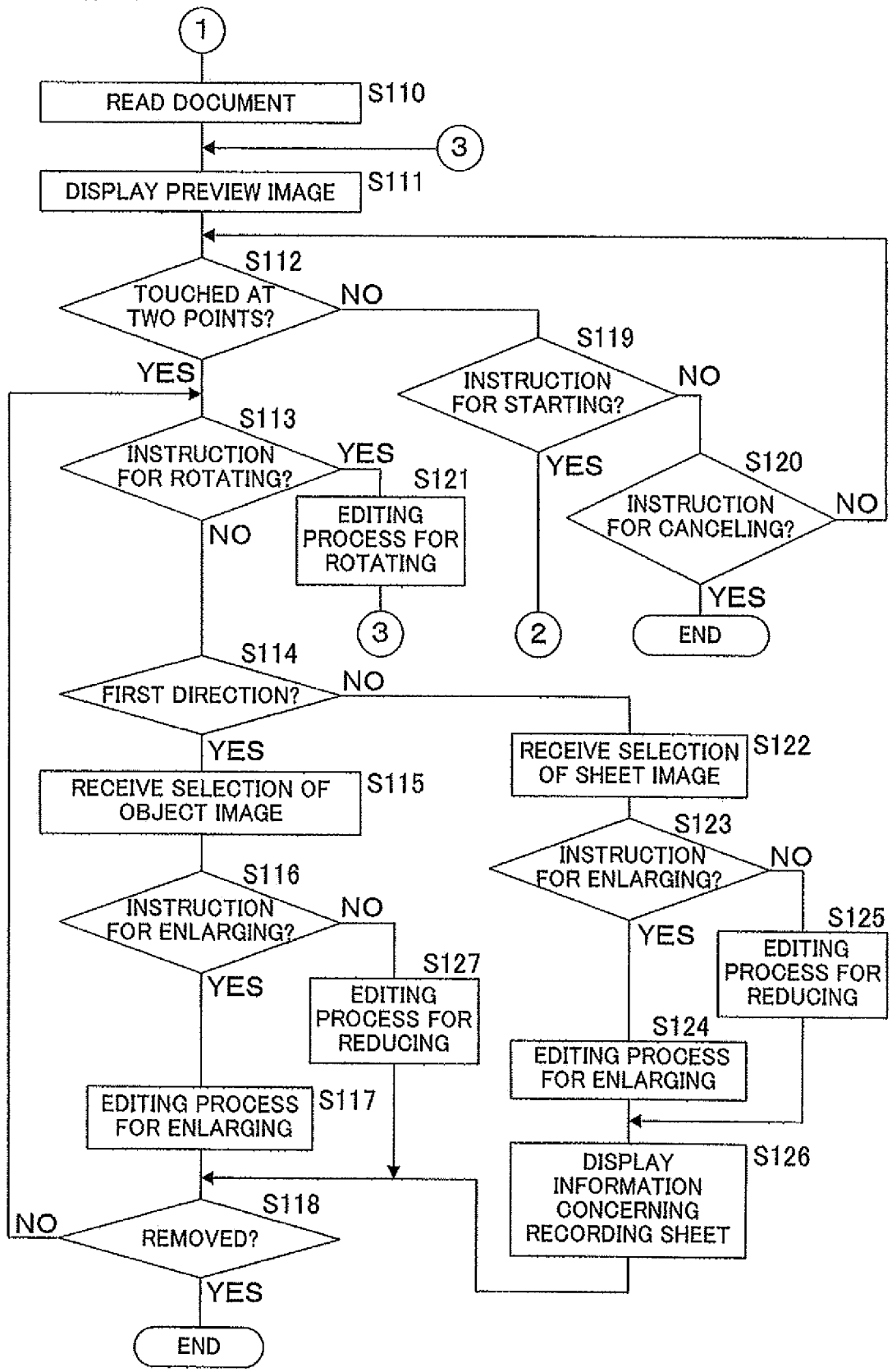
FIG. 4 is a flow chart for describing image editing processing performed in the multi-function peripheral according to Embodiment 1 of the present invention.

Hereinafter, image editing processing performed in the multi-function peripheral 100 according to Embodiment 1 of the present invention will be described. FIGS. 3 and 4 are flow charts for describing image editing processing performed in the multi-function peripheral 100 according to Embodiment 1 of the present invention. For convenience of description, the following description will be made using an example in which the pinch-in or pinch-out operation is performed by the user with his or her thumb and forefinger. Furthermore, in the following description, the trays of the tray section 13 contain A4 sheet, A3 sheet, B4 sheet and B5 sheet, an image displayed on the display section 6 has a rectangular shape, and the selection receiving section 14 receives selection of an object image or a sheet image in response to a pinch-in or pinch-out operation performed along the direction of a diagonal line of the image.

The CPU 2 determines whether or not a document is placed at the read position of the image input section 9 (Step S101). The determination is made based on an image obtained by pre-scanning of the read position, for example.

Upon determination that no document is placed (Step S101: NO), the CPU 2 repeatedly makes the determination until a document is placed.

On the other hand, upon determination that a document is placed (Step S101: YES), the CPU 2 detects a size of the placed document (Step S102). For example, the detection may be performed by using a so-called "reflection type size detection sensor" by which a document size is detected, or pre-scanning may be performed so as to obtain an image for document size detection.

Subsequently, the CPU 2 confirms a sheet status (Step S103). Specifically, based on a detection result obtained by the tray sensor provided for each tray of the tray section 13, the CPU 2 confirms whether or not A4 sheet, A3 sheet, B4 sheet and B5 sheet are contained in the respective trays.

Based on the document size detected in Step S102 and a result of confirmation of the sheet status, the CPU 2 determines whether or not there is a recording sheet having an appropriate size (Step S104). Upon determination that there is no recording sheet having an appropriate size (Step S104: NO), the CPU 2 makes a request for a recording sheet having an appropriate size (Step S108). For example, the CPU 2 provides an instruction to the display controller 7, thereby displaying, on the display section 6, a text that urges the user to fill the tray(s) with recording sheets or to supply a sheet having an appropriate size to a manual feed tray. Then, the processing returns to Step S104.

Upon determination that there is a recording sheet having an appropriate size (Step S104: YES), the CPU 2 selects this recording sheet as an appropriate sheet (Step S105), and stores a result of the selection in the RAM 4. In the present embodiment, an A4 sheet is selected as the appropriate sheet.

Subsequently, the CPU 2 monitors the operation panel 12, thereby determining whether or not a copying instruction is received (Step S106).

For example, when the "copy" key of the operation panel 12 is operated by the user, the CPU 2 determines that a copying instruction is received (Step S106: YES), and provides an instruction for copying to the image input section 9 and the image output section 10. Specifically, image data of the document placed at the read position of the image input section 9 is read by the image input section 9, and the image output section 10 performs printing on the recording sheet based on the image data of the document (Step S107).

On the other hand, upon determination that no copying instruction is received (Step S106: NO), the CPU 2 determines whether or not a scanning instruction is received (Step S109). Upon determination that no scanning instruction is received (Step S109: NO), the CPU 2 returns the processing to Step S106.

Upon determination that a scanning instruction is received (Step S109: YES), the CPU 2 instructs the image input section 9 to read the document placed at the read position of the image input section 9. The image input section 9 reads the document in response to the instruction from the CPU 2 (Step S110). The image data of the document read by the image input section 9 is stored in the RAM 4.

The display controller 7 displays a preview image on the display section 6 based on the image data of the document stored in the RAM 4 (Step S111). The preview image is a rectangular image.

The preview image displayed on the display section 6 includes: an object image indicative of contents of the document, such as a picture, a graphic and/or a character; and a sheet image indicative of the recording sheet to be used at the time of output of the object image. The user, who wishes to execute printing based on the preview image, operates the start key of the operation panel 12, thereby providing an instruction for printing.

On the other hand, the user, who wishes to edit the preview image, touches two points as mentioned above, thereby editing the object image or sheet image.

Based on a signal from the position detecting section 8, the CPU 2 determines whether or not the display screen 61 of the display section 6 is touched at two points (Step S112).

Upon determination that two points are not touched (Step S112: NO), the CPU 2 determines whether or not an instruction for starting printing is received (Step S119). The determination is made by the CPU 2 by monitoring an operation performed on the start key of the operation panel 12.

Upon determination that an instruction for starting printing is received (Step S119: YES), the CPU 2 moves the processing to Step S107, thus the printing is performed by the image output section 10.

On the other hand, upon determination that an instruction for starting printing is not received (Step S119: NO), the CPU 2 determines whether or not an instruction for canceling processing of the document is received (Step S120). The determination is made by the CPU 2 by monitoring an operation performed on the cancel key of the operation panel 12.

Upon determination that an instruction for canceling processing of the document is received (Step S120: YES), the CPU 2 ends the processing.

But upon determination that an instruction for canceling processing of the document is not received (Step S120: NO), CPU 2 returns the processing to Step S112.

On the other hand, upon determination in Step S112 that the display screen 61 of the display section 6 is touched at two points (Step S112: YES), the CPU 2 further determines whether or not an instruction for rotating the preview image is received (Step S113).

More specifically, based on a signal from the position detecting section 8, the CPU 2 monitors whether or not the direction of a straight line connecting the two points is rotated and changed due to movement of one or both of the two points, and when the direction of the straight line is changed, the CPU 2 determines that an instruction for rotating the preview image is received.

Figure 5:
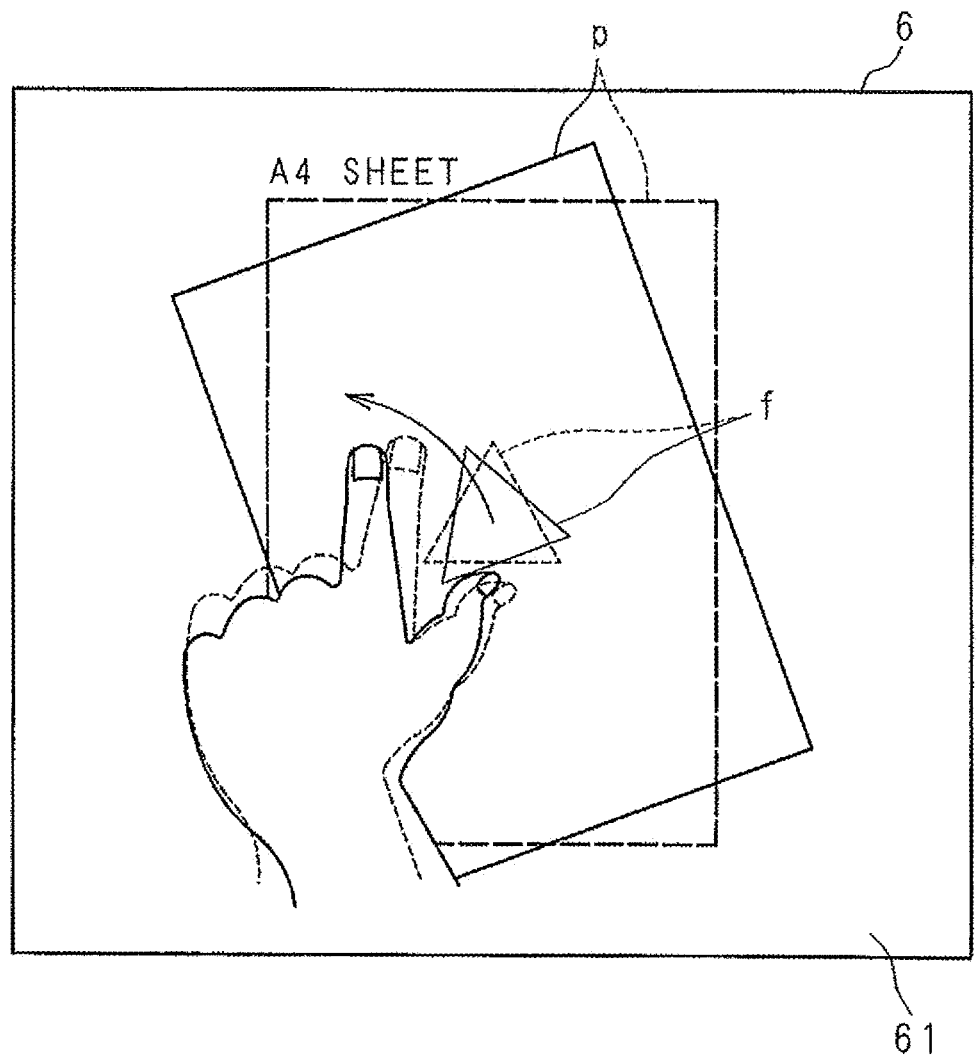
FIG. 5 is an explanatory diagram for describing a preview image rotating process performed in the multi-function peripheral according to Embodiment 1 of the present invention.

FIG. 5 is an explanatory diagram for describing a preview image rotating process performed in the multi-function peripheral 100 according to Embodiment 1 of the present invention. In FIG. 5, an object image is identified by a reference character "f", and a sheet image is identified by a reference character "p". In the following description, the object image f and sheet image p, which are not yet edited by the editing section 17, are represented by dotted lines, and the object image f and sheet image p, which have been edited by the editing section 17, are represented by solid lines.

For example, in a state where the display screen 61 of the display section 6 is touched by the user with his or her left thumb and forefinger, the user twists his left hand in a counterclockwise direction (i.e., in a direction indicated by the arrow in FIG. 5) to move both of the two points touched with the thumb and forefinger as illustrated in FIG. 5; then, the direction of a straight line connecting the two points is rotated and changed. In this case, the CPU 2 receives this change as a rotation instruction for rotating the orientation of the preview image displayed on the display section 6, and in accordance with an amount of rotation in the counterclockwise direction, the editing section 17 performs editing for rotating the orientation of the preview image, displayed on the display section 6, in the counterclockwise direction.

Upon determination that an instruction for rotating the preview image is received (Step S113: YES), the CPU 2 instructs the editing section 17 to perform editing for rotating the preview image. In response to the instruction from the CPU 2, the editing section 17 performs an editing process for rotating the orientation of the preview image as illustrated in FIG. 5 (Step S121). Then, the processing returns to Step S111.

Upon determination that an instruction for rotating the preview image is not received (Step S113: NO), the CPU 2 determines whether or not the direction of the straight line connecting the two points extends along either one of diagonal lines of the preview image (which will hereinafter be referred to as a "first direction") based on a signal from the position detecting section 8 and the preview image, i.e., the coordinates of the points (Step S114).

Figure 6:
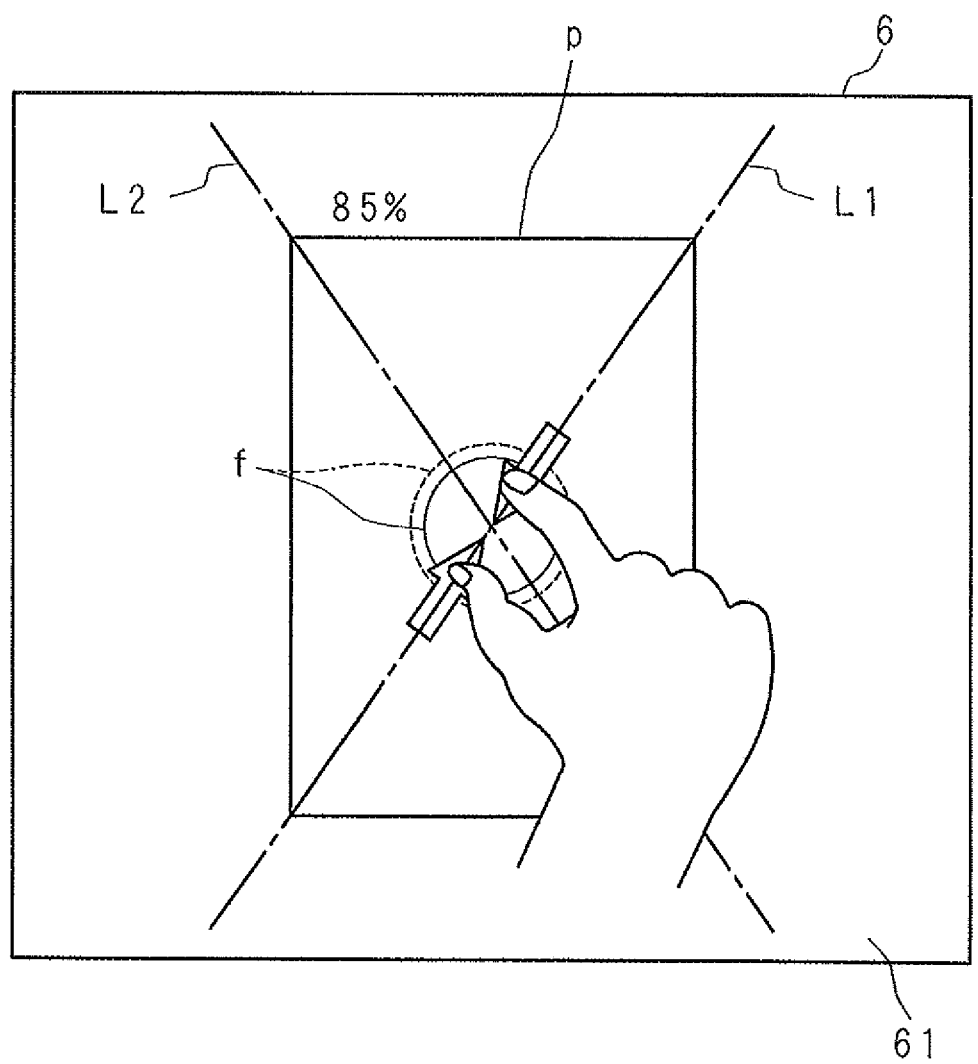
FIG. 6 is an explanatory diagram for describing object image editing performed in the multi-function peripheral according to Embodiment 1 of the present invention.

FIG. 6 is an explanatory diagram for describing editing of the object image f, performed in the multi-function peripheral 100 according to Embodiment 1 of the present invention. In FIG. 6, one of the diagonal lines of the rectangular preview image displayed on the display section 6 (i.e., the first direction) is identified by a reference character "L1", and the other diagonal line (i.e., a second direction) is identified by a reference character "L2". In the present embodiment, when the direction of the straight line connecting the two points extends along the first direction, the object image f is edited. On the other hand, when the direction of the straight line extends along the second direction, the sheet image p is edited.

Upon determination by the CPU 2 that the direction of the straight line connecting the two points extends along the first direction (Step S114: YES), the selection receiving section 14 receives selection of the object image f (Step S115). In this case, in order to allow the user to visually recognize the above fact, the object image f may be colored with a given color, or may be allowed to blink.

Then, the user performs a pinch-in or pinch-out operation to provide an instruction for reducing or enlarging the object image f.

Based on a signal from the position detecting section 8, the CPU 2 determines whether or not an instruction for enlarging the object image f is received (Step S116). In other words, the CPU 2 determines whether or not a pinch-out operation is performed based on a signal from the position detecting section 8.

Upon determination by the CPU 2 that an instruction for enlarging the object image f is received (Step S116: YES), i.e., when a pinch-out operation is performed by the user, the editing section 17 performs an editing process for enlarging the object image f in accordance with a change in the distance between the two points, which is caused by the pinch-out operation (Step S117). Editing for enlargement, performed by the editing section 17, has already been described above, and therefore, the detailed description thereof will be omitted.

Upon determination by the CPU 2 that an instruction for enlarging the object image f is not received (Step S116: NO), i.e., when a pinch-in operation is performed by the user, the editing section 17 performs an editing process for reducing the object image f in accordance with a change in the distance between the two points, which is caused by the pinch-in operation (Step S127). Editing for reduction, performed by the editing section 17, has already been described above, and therefore, the detailed description thereof will be omitted.

For example, when the user performs a pinch-in operation by moving his or her thumb and forefinger in a direction indicated by the arrows as illustrated in FIG. 6, the size of the sheet image p is not changed, but only the size of the object image f is reduced.

Note that in this case, the information display section 16 displays, as illustrated in FIG. 6, a change in scaling factor for the size of the object image f, which is caused by the pinch-in operation.

Then, the user, who has completed an operation for editing the preview image, removes his or her fingers from the display screen 61 of the display section 6. On the other hand, the user, who continues to perform an operation for editing the object image f, rotates his or her fingers and performs a pinch-in or pinch-out operation again.

Based on a signal from the position detecting section 8, the CPU 2 determines whether or not the user's fingers are removed from the display screen 61 of the display section 6 (Step S118).

Upon determination that the user's fingers are removed from the display screen 61 of the display section 6 (Step S118: YES), the CPU 2 ends the processing. But upon determination that the user's fingers are not removed from the display screen 61 of the display section 6 (Step S118: NO), the CPU 2 returns the processing to Step S113 again.

On the other hand, when the CPU 2 determines in Step S114 that the direction of the straight line connecting the two points does not extend along the first direction (Step S114: NO), i.e., when the direction of the straight line connecting the two points is the second direction (L2 in FIG. 6), the selection receiving section 14 receives selection of the sheet image p (Step S122). In this case, in order to allow the user to visually recognize the above fact, the sheet image p may be colored with a given color, or may be allowed to blink.

Then, the user performs a pinch-in or pinch-out operation to provide an instruction for reducing or enlarging the sheet image p.

Based on a signal from the position detecting section 8, the CPU 2 determines whether or not an instruction for enlarging the sheet image p is received (Step S123). In other words, the CPU 2 determines whether or not a pinch-out operation is performed based on a signal from the position detecting section 8.

Upon determination by the CPU 2 that an instruction for enlarging the sheet image p is received (Step S123: YES), i.e., when a pinch-out operation is performed by the user, the editing section 17 performs an editing process for enlarging the sheet image p in accordance with a change in the distance between the two points, which is caused by the pinch-out operation (Step S124). Editing for enlargement, performed by the editing section 17, has already been described above, and therefore, the detailed description thereof will be omitted.

Upon determination by the CPU 2 that an instruction for enlarging the sheet image p is not received (Step S123: NO), i.e., when a pinch-in operation is performed by the user, the editing section 17 performs an editing process for reducing the sheet image p in accordance with a change in the distance between the two points, which is caused by the pinch-in operation (Step S125). Editing for reduction, performed by the editing section 17, has already been described above, and therefore, the detailed description thereof will be omitted.

When editing for enlarging the sheet image p is performed in Step S124 or when editing for reducing the sheet image p is performed in Step S125, the information display section 16 displays, on the display section 6, information concerning a recording sheet that replaces a previous recording sheet due to the editing (Step S126). Specifically, when the editing section 17 edits the size of the sheet image p, the sheet deciding section 15 decides a recording sheet to be outputted, and information concerning the decided recording sheet is displayed by the information display section 16.

Figure 7:
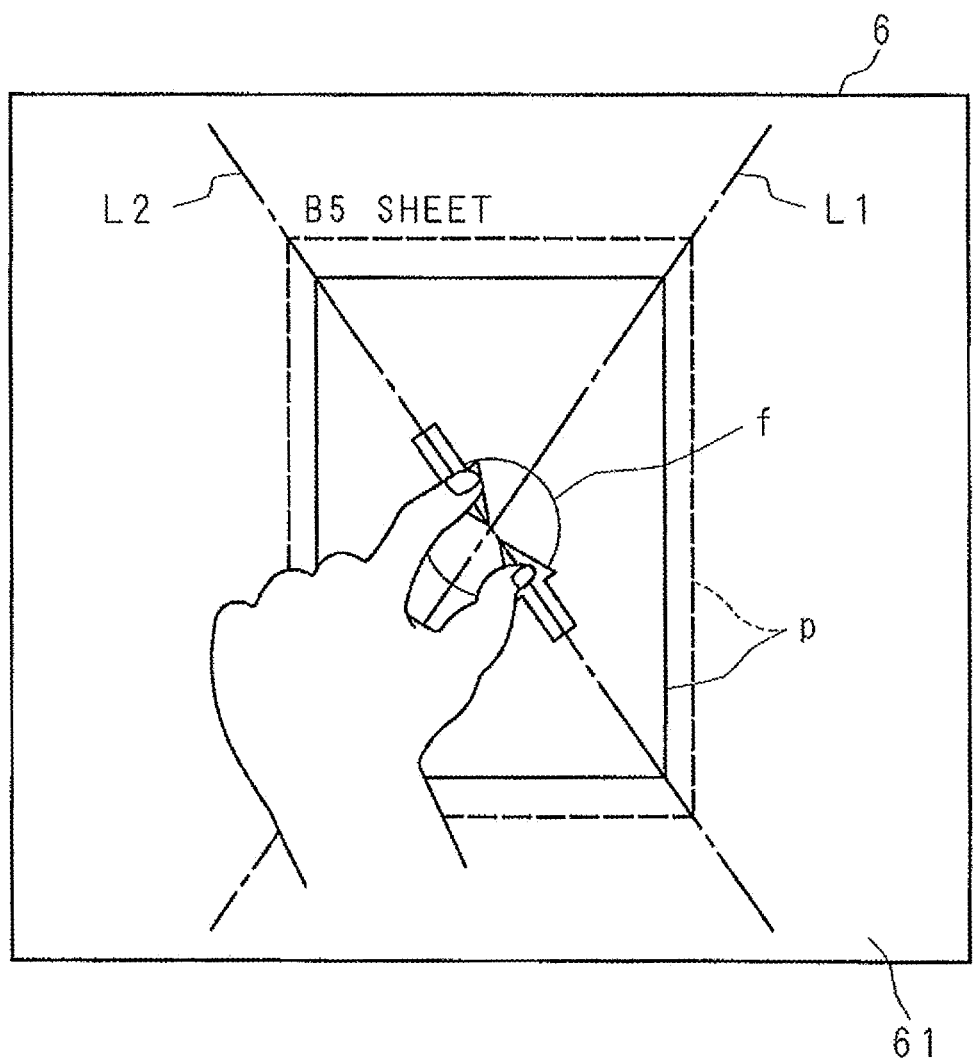
FIG. 7 is an explanatory diagram for describing sheet image editing performed in the multi-function peripheral according to Embodiment 1 of the present invention.
Figure 8:
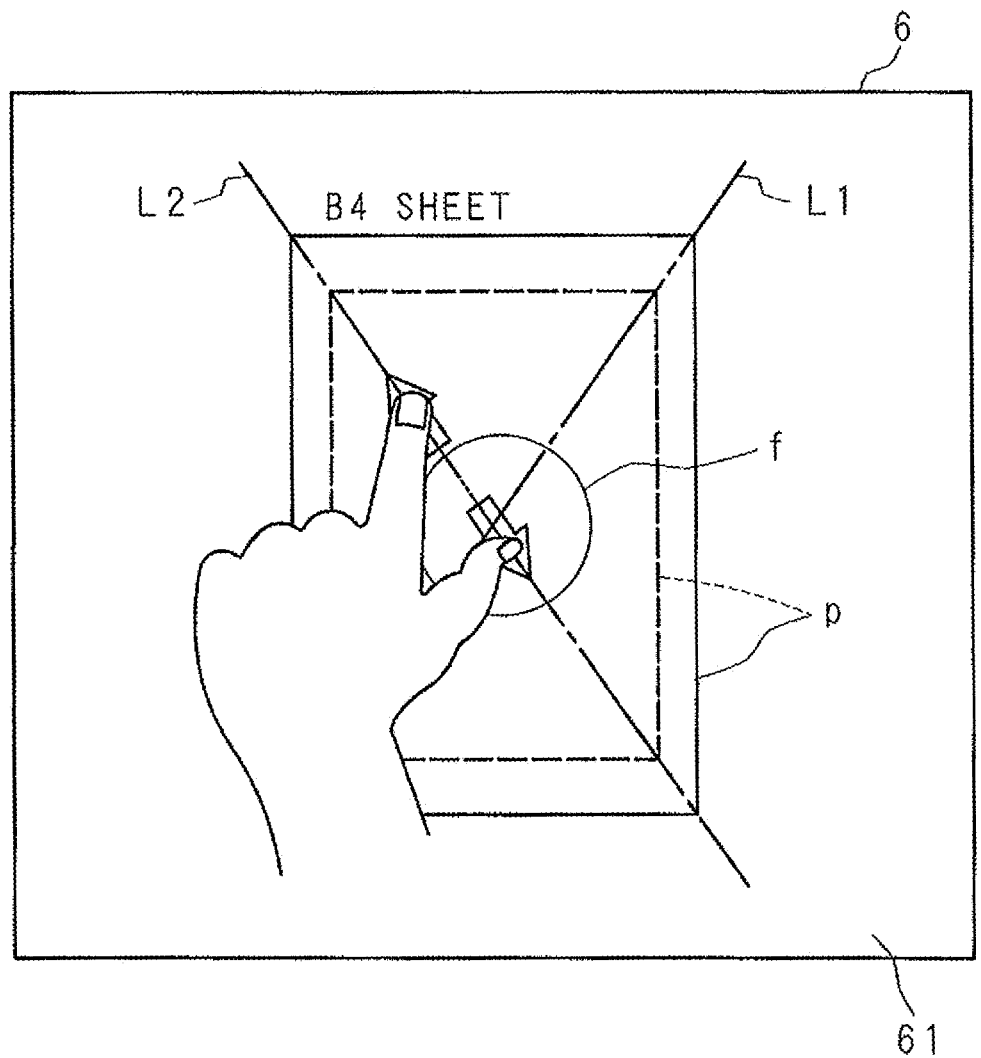
FIG. 8 is an explanatory diagram for describing sheet image editing performed in the multi-function peripheral according to Embodiment 1 of the present invention.

FIGS. 7 and 8 are explanatory diagrams for describing editing of the sheet image p, performed in the multi-function peripheral 100 according to Embodiment 1 of the present invention.

For example, when the user performs a pinch-in operation by moving his or her thumb and forefinger in a direction indicated by the arrows as illustrated in FIG. 7, the size of the object image f is not changed, but only the size of the sheet image p is reduced. In this case, as illustrated in FIG. 7, the information display section 16 displays, on the display section 6, information concerning a recording sheet that replaces a previous recording sheet due to the pinch-in operation, i.e., the recording sheet decided by the sheet deciding section 15. FIG. 7 illustrates an example in which a text indicating, instead of the A4 sheet selected in Step S105, the "B5 sheet" that is a recording sheet having a smaller size is displayed as the information.

On the other hand, when the user performs a pinch-out operation by moving his or her thumb and forefinger in a direction indicated by the arrows as illustrated in FIG. 8, the size of the object image f is not changed, but only the size of the sheet image p is increased. In this case, as illustrated in FIG. 8, the information display section 16 displays, on the display section 6, information concerning a recording sheet that replaces a previous recording sheet due to the pinch-out operation, i.e., the recording sheet decided by the sheet deciding section 15. FIG. 8 illustrates an example in which a text indicating, instead of the A4 sheet selected in Step S105, the "B4 sheet" that is a recording sheet having a larger size is displayed as the information.

Then, the object image f edited by the editing section 17 is printed on the recording sheet decided by the sheet deciding section 15.

When partial editing is performed by the editing section 17 as mentioned above, the multi-function peripheral 100 according to the present invention can receive both of an instruction for selecting a partial editing target and an editing instruction, and thus can reduce the user's time and effort.

Further, the above description has been made on the example in which an image displayed on the display section 6 has contents such as an object image and a sheet image, and partial editing is performed for each of the contents; however, the present invention is not limited to this example. For example, partial editing may be performed for each type of contents such as a photograph and a character, and/or may be performed for each color.

In other words, different types of contents may be selected and/or contents having different colors may be selected based on the direction of a straight line connecting two points detected by the position detecting section 8.

For example, when editing for enlarging/reducing an object image displayed on the display section 6 is performed, there arises the need to appropriately replace a recording sheet with another recording sheet, on which printing is to be performed, in accordance with a change in the size of the object image caused by the editing. Therefore, in order to select a recording sheet, the user might be forced to perform a cumbersome operation for calling up another screen so as to select a recording sheet having an appropriate size. However, in the multi-function peripheral 100 according to the present invention, editing of an image and selection of a recording sheet are performed on the same screen as described above, thus making it possible to avoid a cumbersome operation.

Embodiment 2

A multi-function peripheral 100 according to Embodiment 2 of the present invention is formed substantially similarly to the multi-function peripheral 100 according to Embodiment 1, but configurations and functions of the storage 5 and the controller 1 of the multi-function peripheral 100 according to Embodiment 2 differ from those of the storage 5 and controller 1 of the multi-function peripheral 100 according to Embodiment 1.

The storage 5 includes a nonvolatile non-transitory computer-readable storage medium such as a flash memory, an EEPROM, an HDD, an MRAM, an FeRAM or an OUM, for example. Further, the storage 5 stores a correspondence table in which changes of recording sheets to be outputted and scaling factors for the size of the object image f are associated with each other.

FIG. 9 is a diagram illustrating an example of the correspondence table stored in the storage 5 in the multi-function peripheral 100 according to Embodiment 2 of the present invention. The correspondence table provides, for example, correspondence relationships when the sizes of both of an object image and a recording sheet, which are to be outputted, are enlarged/reduced, i.e., when the sizes of both of the object image f and the sheet image p are edited. Specifically, the correspondence table provides correspondence relationships as follows. For example, when the sheet image p is enlarged from the size associated with "A4 sheet" to the size associated with "A3 sheet", the scaling factor for the corresponding object image f is "141%", and when the sheet image p is reduced from the size associated with "A4 sheet" to the size associated with "B5 sheet", the scaling factor for the corresponding object image f is "86%".

When a touch operation performed on two points is received from the user, the selection receiving section 14 of the controller 1 receives, based on a signal emitted from the position detecting section 8, selection of the object image f or sheet image p as an editing target for an image displayed on the display section 6, in accordance with the direction of a straight line connecting the two points.

For example, the selection receiving section 14 receives selection of the object image f or sheet image p in accordance with the direction of the straight line extending along either one of two directions intersecting at a center of the image displayed on the display section 6.

On the other hand, when the direction of the straight line extends along neither of the two directions, the selection receiving section 14 receives selection of the object image f and sheet image p. In other words, both of the object image f and sheet image p are selected.

Furthermore, when the selection of the object image f and sheet image p is received by the selection receiving section 14 as mentioned above, the editing section 17 edits the image based on the correspondence table.

Specifically, upon reception of selection of the object image f and sheet image p by the selection receiving section 14, the editing section 17 performs editing as follows. When a pinch-in or pinch-out operation is performed by the user and the scaling factor for the object image f, resulting from the operation, corresponds to 122%; then, the editing section 17 concurrently performs editing for enlarging the sheet image p, which is associated with "A4 sheet", to the sheet image p associated with "B4 sheet". On the other hand, when a pinch-in or pinch-out operation is performed by the user and the scaling factor for the object image f, resulting from the operation, corresponds to 81%; then, the editing section 17 concurrently performs editing for reducing the sheet image p, which is associated with "B4 sheet", to the sheet image p associated with "A4 sheet".

Figure 10:
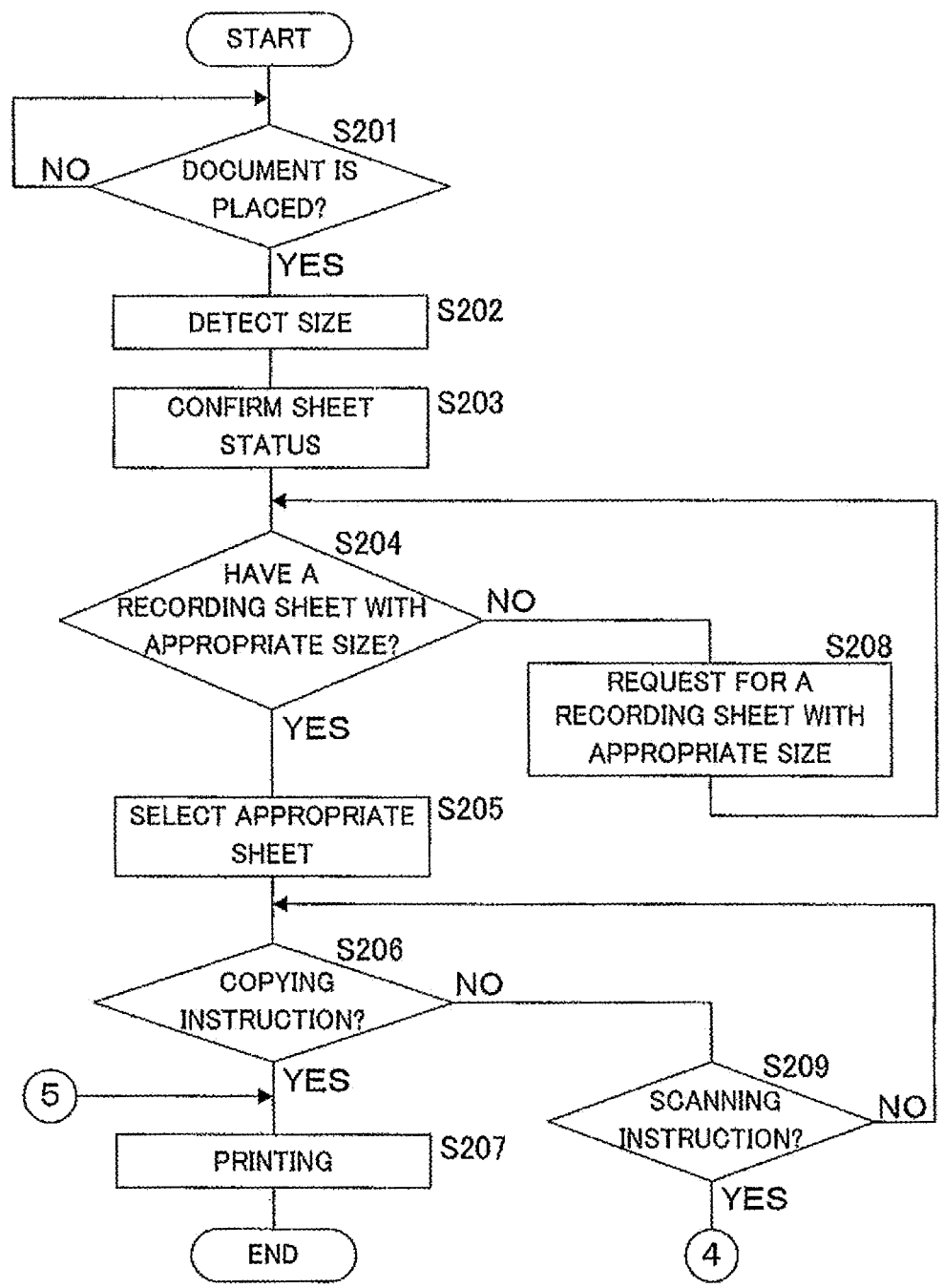
FIG. 10 is a flow chart for describing image editing processing performed in the multi-function peripheral according to Embodiment 2 of the present invention.
Figure 11:
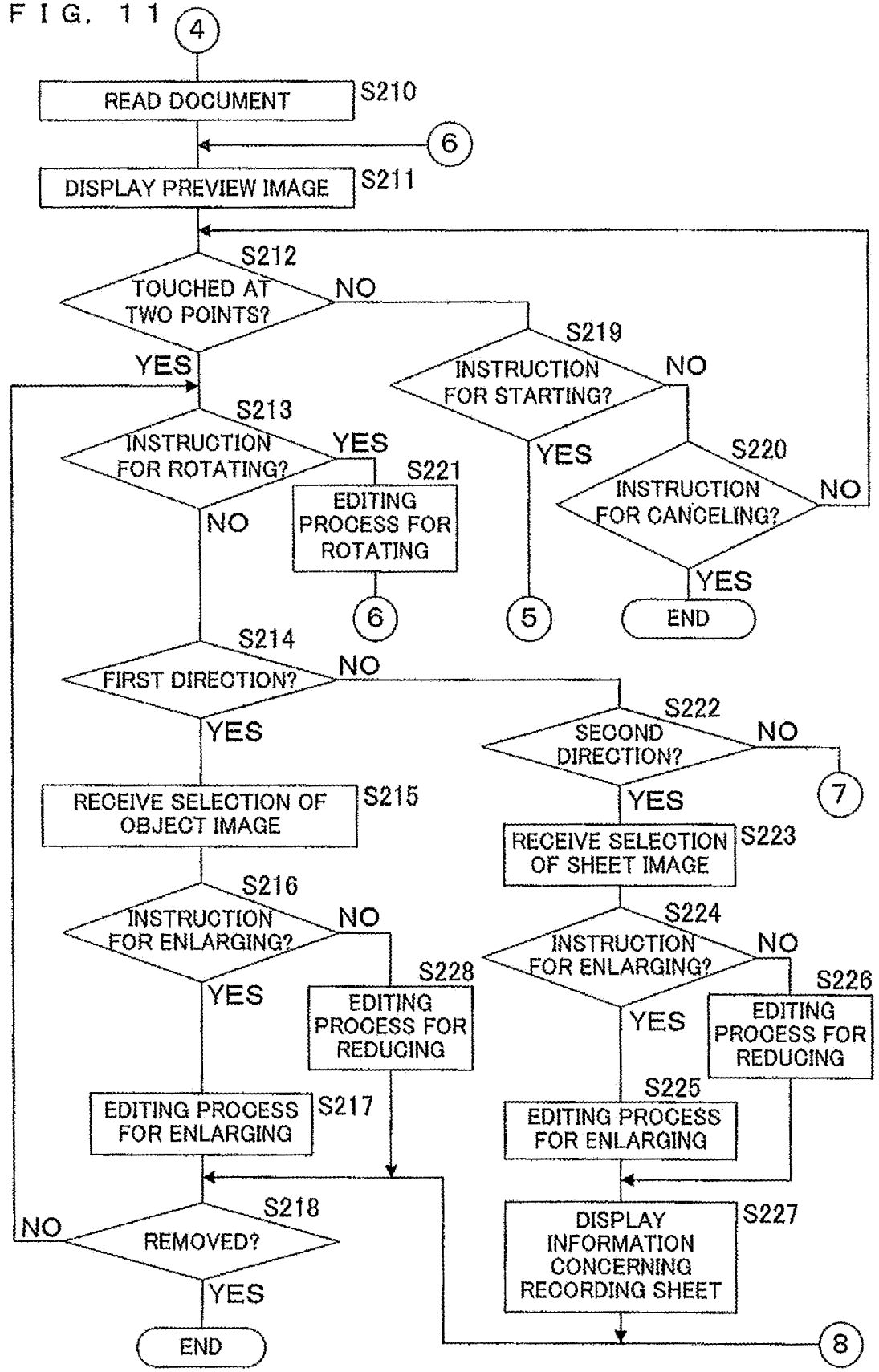
FIG. 11 is a flow chart for describing image editing processing performed in the multi-function peripheral according to Embodiment 2 of the present invention.
Figure 12:
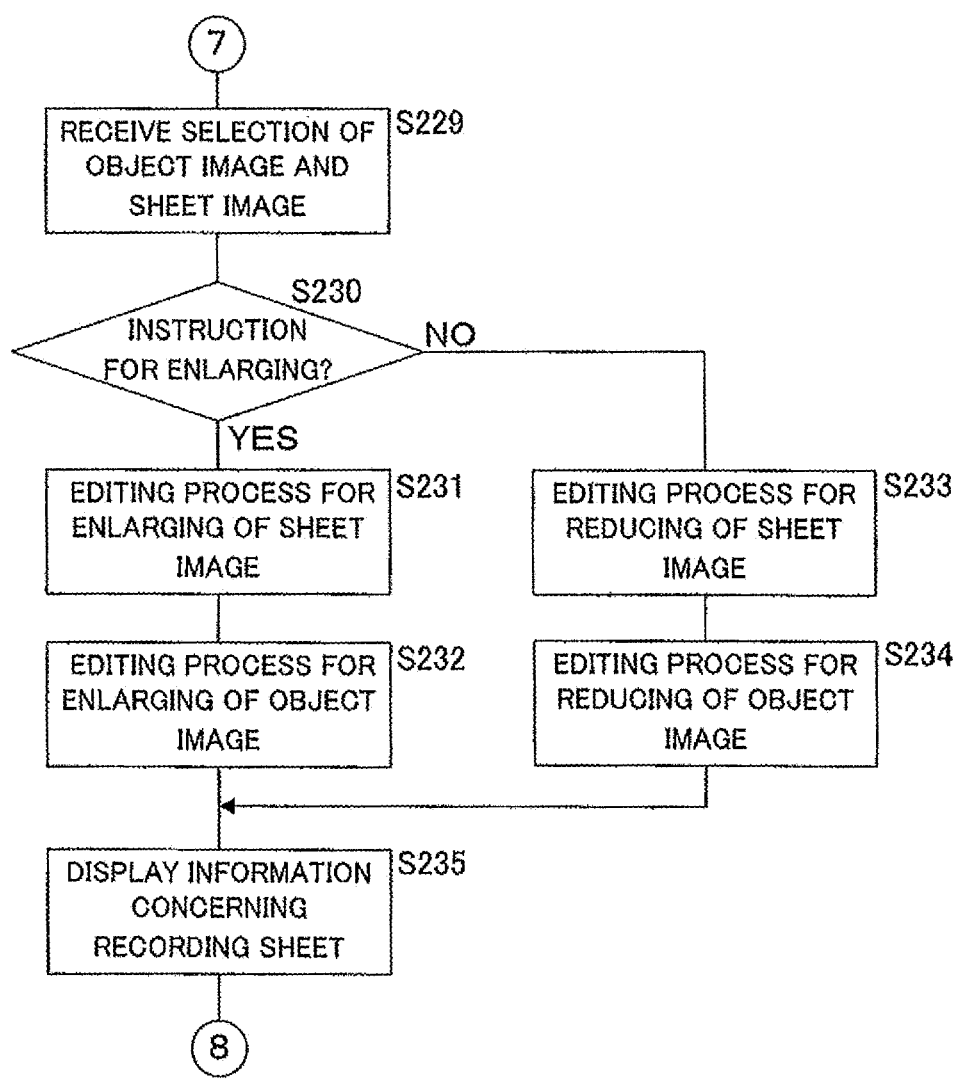
FIG. 12 is a flow chart for describing image editing processing performed in the multi-function peripheral according to Embodiment 2 of the present invention.

Hereinafter, image editing processing performed in the multi-function peripheral 100 according to Embodiment 2 of the present invention will be described. FIGS. 10 to 12 are flow charts for describing image editing processing performed in the multi-function peripheral 100 according to Embodiment 2 of the present invention. For convenience of description, the following description will be made using an example in which the pinch-in or pinch-out operation is performed by the user with his or her thumb and forefinger. Furthermore, in the following description, the trays of the tray section 13 contain A4 sheet, A3 sheet, B4 sheet and B5 sheet, an image displayed on the display section 6 has a rectangular shape, and the selection receiving section 14 receives selection of the object image f or sheet image p in response to the pinch-in or pinch-out operation performed along a vertical or horizontal direction of the image.

The CPU 2 determines whether or not a document is placed at the read position of the image input section 9 (Step S201). Upon determination that no document is placed (Step S201: NO), the CPU 2 repeatedly makes the determination until a document is placed.

On the other hand, upon determination that a document is placed (Step S201: YES), the CPU 2 detects a size of the placed document (Step S202).

Subsequently, the CPU 2 confirms a sheet status (Step S203). Specifically, based on a detection result obtained by the tray sensor provided for each tray of the tray section 13, the CPU 2 confirms whether or not A4 sheet, A3 sheet, B4 sheet and B5 sheet are contained in the respective trays.

Based on the document size detected in Step S202 and a result of confirmation of the sheet status, the CPU 2 determines whether or not there is a recording sheet having an appropriate size (Step S204). Upon determination that there is no recording sheet having an appropriate size (Step S204: NO), the CPU 2 makes a request for a recording sheet having an appropriate size (Step S208). Then, the processing returns to Step S204.

Upon determination that there is a recording sheet having an appropriate size (Step S204: YES), the CPU 2 selects this recording sheet as an appropriate sheet (Step S205), and stores a result of the selection in the RAM 4. In the present embodiment, an A4 sheet is selected as the appropriate sheet.

Subsequently, the CPU 2 monitors the operation panel 12, thereby determining whether or not a copying instruction is received (Step S206).

For example, when the "copy" key of the operation panel 12 is operated by the user, the CPU 2 determines that a copying instruction is received (Step S206: YES); then, image data of the document placed at the read position of the image input section 9 is read by the image input section 9, and the image output section 10 performs printing on the recording sheet based on the image data of the document (Step S207).

On the other hand, upon determination that no copying instruction is received (Step S206: NO), the CPU 2 determines whether or not a scanning instruction is received (Step S209). Upon determination that no scanning instruction is received (Step S209: NO), the CPU 2 returns the processing to Step S206.

Upon determination that a scanning instruction is received (Step S209: YES), the CPU 2 instructs the image input section 9 to read the document placed at the read position of the image input section 9, and the image input section 9 reads the document (Step S210). The image data of the document read by the image input section 9 is stored in the RAM 4.

The display controller 7 displays a preview image on the display section 6 based on the image data of the document stored in the RAM 4 (Step S211). The preview image is a rectangular image, and includes the object image f and sheet image p similarly to Embodiment 1.

The user, who wishes to execute printing based on the preview image, operates the start key of the operation panel 12, thereby providing an instruction for printing. On the other hand, the user, who wishes to edit the preview image, touches two points as mentioned above, thereby editing the object image f or sheet image p.

Based on a signal from the position detecting section 8, the CPU 2 determines whether or not the display screen 61 of the display section 6 is touched at two points (Step S212). Upon determination that two points are not touched (Step S212: NO), the CPU 2 determines whether or not an instruction for starting printing is received (Step S219).

Upon determination that an instruction for starting printing is received (Step S219: YES), the CPU 2 moves the processing to Step S207, thus the printing is performed by the image output section 10.

On the other hand, upon determination that an instruction for starting printing is not received (Step S219: NO), the CPU 2 determines whether or not an instruction for canceling processing of the document is received (Step S220).

Upon determination that an instruction for canceling processing of the document is received (Step S220: YES), the CPU 2 ends the processing. But upon determination that an instruction for canceling processing of the document is not received (Step S220: NO), CPU 2 returns the processing to Step S212.

On the other hand, upon determination in Step S212 that the display screen 61 of the display section 6 is touched at two points (Step S212: YES), the CPU 2 further determines whether or not an instruction for rotating the preview image is received (Step S213).

Upon determination that an instruction for rotating the preview image is received (Step S213: YES), the CPU 2 instructs the editing section 17 to perform editing for rotating the preview image, and the editing section 17 performs an editing process for rotating the orientation of the preview image (Step S221).

Upon determination that an instruction for rotating the preview image is not received (Step S213: NO), the CPU 2 determines, based on a signal from the position detecting section 8 and the preview image (i.e., the coordinates), whether or not the direction of the straight line connecting the two points extends along the direction of a vertical line (hereinafter referred to as a "first direction"), which is included in vertical and horizontal lines intersecting at a center of the preview image (Step S214).

Figure 13:
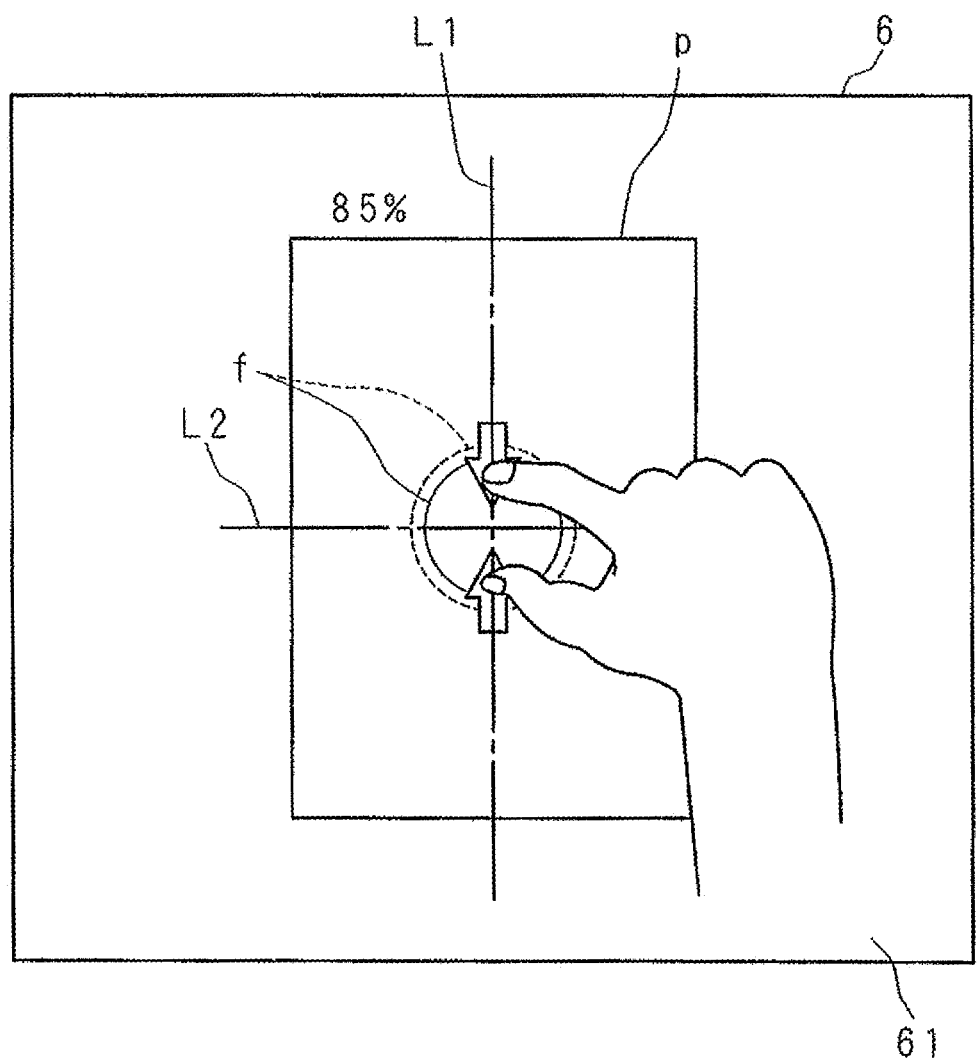
FIG. 13 is an explanatory diagram for describing object image editing performed in the multi-function peripheral according to Embodiment 2 of the present invention.

FIG. 13 is an explanatory diagram for describing editing of the object image f, performed in the multi-function peripheral 100 according to Embodiment 2 of the present invention. In FIG. 13, the direction of the vertical line of the rectangular preview image displayed on the display section 6 (i.e., the first direction) is identified by a reference character "L1", and the direction of the horizontal line (i.e., a second direction) is identified by a reference character "L2". In the present embodiment, when the direction of the straight line connecting the two points extends along the first direction, the object image f is edited. On the other hand, when the direction of the straight line extends along the second direction, the sheet image p is edited.

Upon determination by the CPU 2 that the direction of the straight line connecting the two points extends along the first direction (Step S214: YES), the selection receiving section 14 receives selection of the object image f (Step S215). In this case, in order to allow the user to visually recognize the above fact, the object image f may be colored with a given color, or may be allowed to blink. Then, the user performs a pinch-in or pinch-out operation to provide an instruction for reducing or enlarging the object image f.

Based on a signal from the position detecting section 8, the CPU 2 determines whether or not an instruction for enlarging the object image f is received (Step S216). Upon determination by the CPU 2 that an instruction for enlarging the object image f is received (Step S216: YES), i.e., when a pinch-out operation is performed by the user, the editing section 17 performs an editing process for enlarging the object image f in accordance with a change in the distance between the two points, which is caused by the pinch-out operation (Step S217). Editing for enlargement, performed by the editing section 17, has already been described above, and therefore, the detailed description thereof will be omitted.

Upon determination by the CPU 2 that an instruction for enlarging the object image f is not received (Step S216: NO), i.e., when a pinch-in operation is performed by the user, the editing section 17 performs an editing process for reducing the object image f in accordance with a change in the distance between the two points, which is caused by the pinch-in operation (Step S228). Editing for reduction, performed by the editing section 17, has already been described above, and therefore, the detailed description thereof will be omitted.

For example, when the user performs a pinch-in operation by moving his or her thumb and forefinger in a direction indicated by the arrows as illustrated in FIG. 13, the size of the sheet image p is not changed, but only the size of the object image f is reduced. In this case, the information display section 16 displays, as illustrated in FIG. 13, a change in scaling factor for the size of the object image 1, caused by the pinch-in operation.

Then, the user, who has completed an operation for editing the preview image, removes his or her fingers from the display screen 61 of the display section 6. On the other hand, the user, who continues to perform an operation for editing the object image f, rotates his or her fingers and performs a pinch-in or pinch-out operation again.

Based on a signal from the position detecting section 8, the CPU 2 determines whether or not the user's fingers are removed from the display screen 61 of the display section 6 (Step S218). Upon determination that the user's fingers are removed from the display screen 61 of the display section 6 (Step S218: YES), the CPU 2 ends the processing. But upon determination that the user's fingers are not removed from the display screen 61 of the display section 6 (Step S218: NO), the CPU 2 returns the processing to Step S213 again.

On the other hand, upon determination in Step S214 that the direction of the straight line connecting the two points does not extend along the first direction (Step S214: NO), the CPU 2 determines whether or not the direction of the straight line extends along the second direction (L2 in FIG. 13), based on a signal from the position detecting section 8 (Step S222).

Upon determination by the CPU 2 that the direction of the straight line extends along the second direction (Step S222:

YES), the selection receiving section 14 receives selection of the sheet image p (Step S223). In this case, in order to allow the user to visually recognize the above fact, the sheet image p may be colored with a given color, or may be allowed to blink. Then, the user performs a pinch-in or pinch-out operation to provide an instruction for reducing or enlarging the sheet image p.

Based on a signal from the position detecting section 8, the CPU 2 determines whether or not an instruction for enlarging the sheet image p is received (Step S224). Upon determination by the CPU 2 that an instruction for enlarging the sheet image p is received (Step S224: YES), i.e., when a pinch-out operation is performed by the user, the editing section 17 performs an editing process for enlarging the sheet image p in accordance with a change in the distance between the two points, which is caused by the pinch-out operation (Step S225). Editing for enlargement, performed by the editing section 17, has already been described above, and therefore, the detailed description thereof will be omitted.

Upon determination by the CPU 2 that an instruction for enlarging the sheet image p is not received (Step S224: NO), i.e., when a pinch-in operation is performed by the user, the editing section 17 performs an editing process for reducing the sheet image p in accordance with a change in the distance between the two points, which is caused by the pinch-in operation (Step S226). Editing for reduction, performed by the editing section 17, has already been described above, and therefore, the detailed description thereof will be omitted.

When editing for enlarging the sheet image p is performed in Step S225 or when editing for reducing the sheet image p is performed in Step S226, the information display section 16 displays, on the display section 6, information concerning a recording sheet that replaces a previous recording sheet due to the editing (Step S227).

Figure 14:
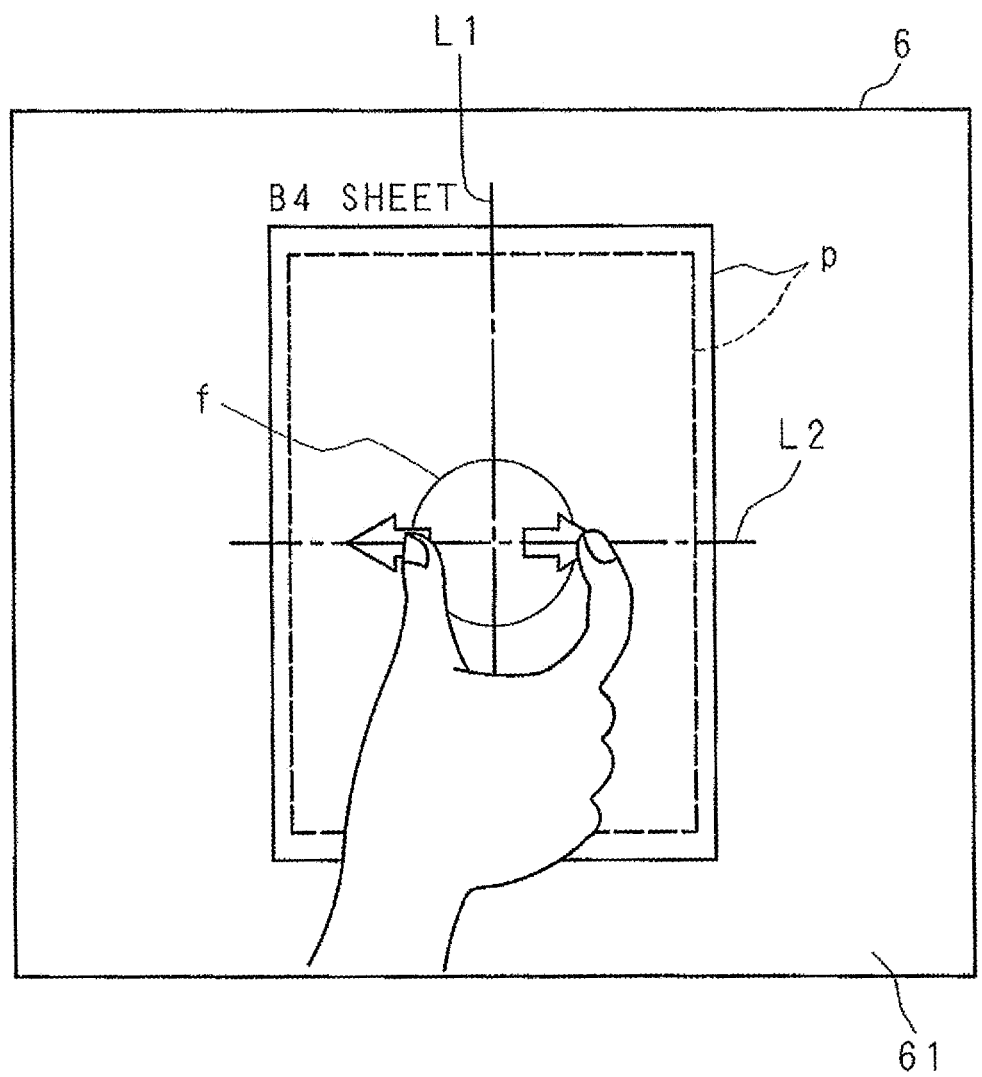
FIG. 14 is an explanatory diagram for describing editing for enlarging a sheet image in the multi-function peripheral according to Embodiment 2 of the present invention.

FIG. 14 is an explanatory diagram for describing editing for enlarging the sheet image p in the multi-function peripheral 100 according to Embodiment 2 of the present invention.

For example, when the user performs a pinch-out operation by moving his or her thumb and forefinger in a direction indicated by the arrows as illustrated in FIG. 14, the size of the object image f is not changed, but only the size of the sheet image p is increased. In this case, as illustrated in FIG. 14, the information display section 16 displays, on the display section 6, information concerning a recording sheet that replaces a previous recording sheet clue to the pinch-out operation, i.e., the recording sheet decided by the sheet deciding section 15. FIG. 14 illustrates an example in which a text indicating, instead of the A4 sheet selected in Step S205, the "B4 sheet" that is a recording sheet having a larger size is displayed as the information.

On the other hand, when it is determined in Step S222 by the CPU 2 that the direction of the straight line does not extend along the second direction (Step S222: NO), i.e., when the direction of the straight line connecting the two points is neither the first direction nor the second direction, the selection receiving section 14 receives selection of the sheet image p and object image f (Step S229).

In this case, the direction of the straight line connecting the two points, touched by the user's thumb and forefinger, will be determined as the direction of a diagonal line of the rectangular image displayed on the display section 6, and then the user will perform a pinch-in or pinch-out operation, thereby providing an instruction for reducing or enlarging the sheet image p and object image f.

Based on a signal from the position detecting section 8, the CPU 2 determines whether or not an instruction for enlarging the sheet image p and object image f is received (Step S230). Upon determination by the CPU 2 that an instruction for enlarging the sheet image p and object image f is received (Step S230: YES), i.e., when a pinch-out operation is performed by the user, the editing section 17 performs an editing process for enlarging the sheet image p in accordance with a change in the distance between the two points, which is caused by the pinch-out operation (Step S231).

Furthermore, based on the correspondence table stored in the storage 5, the editing section 17 performs an editing process for enlarging the object image f by a scaling factor corresponding to the foregoing editing for enlarging the sheet image p (Step S232).

Subsequently, the sheet deciding section 15 decides a sheet by the above-described method, and the information display section 16 displays, on the display section 6, information concerning the sheet decided by the sheet deciding section 15 (Step S235).

On the other hand, upon determination by the CPU 2 that an instruction for enlarging the sheet image p and object image f is not received (Step S230: NO), i.e., when a pinch-in operation is performed by the user, the editing section 17 performs an editing process for reducing the sheet image p in accordance with a change in the distance between the two points, which is caused by the pinch-in operation (Step S233).

Furthermore, based on the correspondence table stored in the storage 5, the editing section 17 performs an editing process for reducing the object image f by a scaling factor corresponding to the foregoing editing for reducing the sheet image p (Step S234).

Subsequently, the sheet deciding section 15 decides a sheet by the above-described method, and the information display section 16 displays, on the display section 6, information concerning the sheet decided by the sheet deciding section 15 (Step S235). In this case, the information display section 16 may concurrently display the scaling factor for the editing of the object image f.

Figure 15:
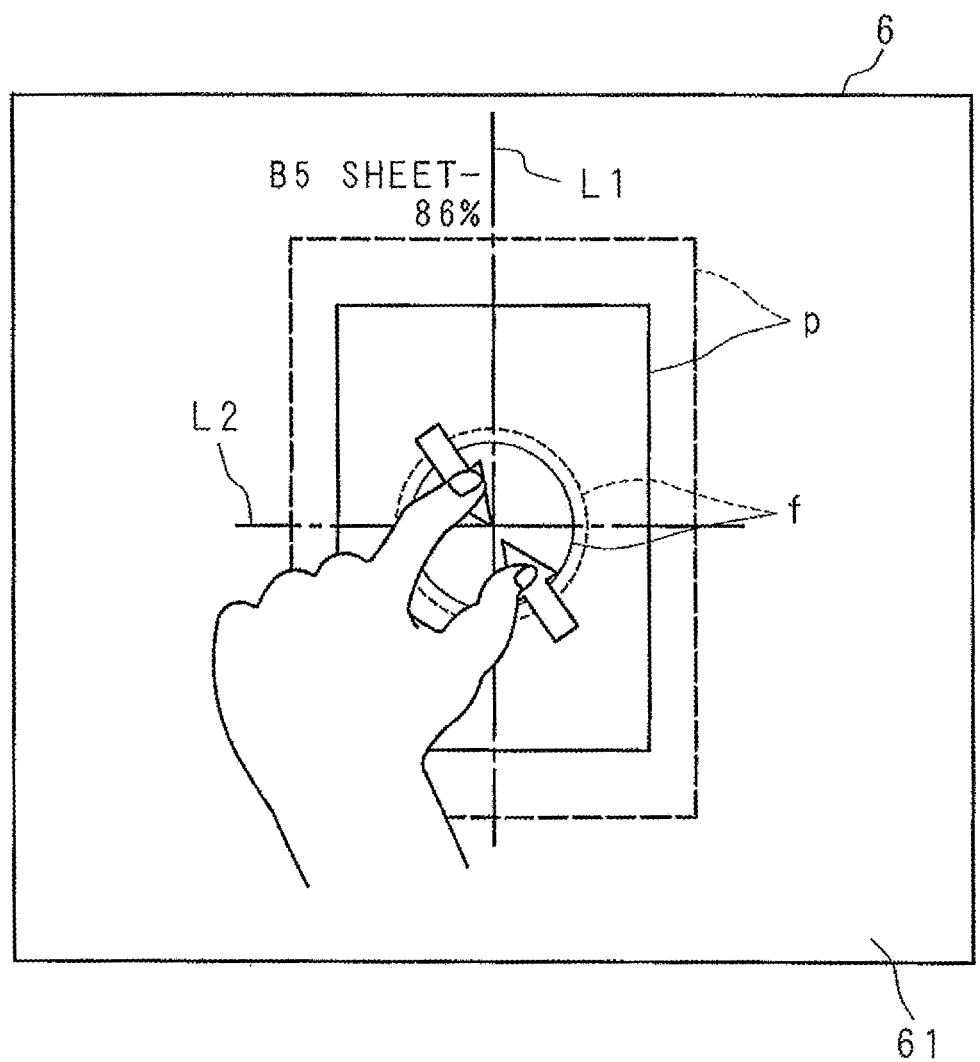
FIG. 15 is an explanatory diagram for describing a case where both of a sheet image and an object image are edited in the multi-function peripheral according to Embodiment 2 of the present invention.
Figure 16:
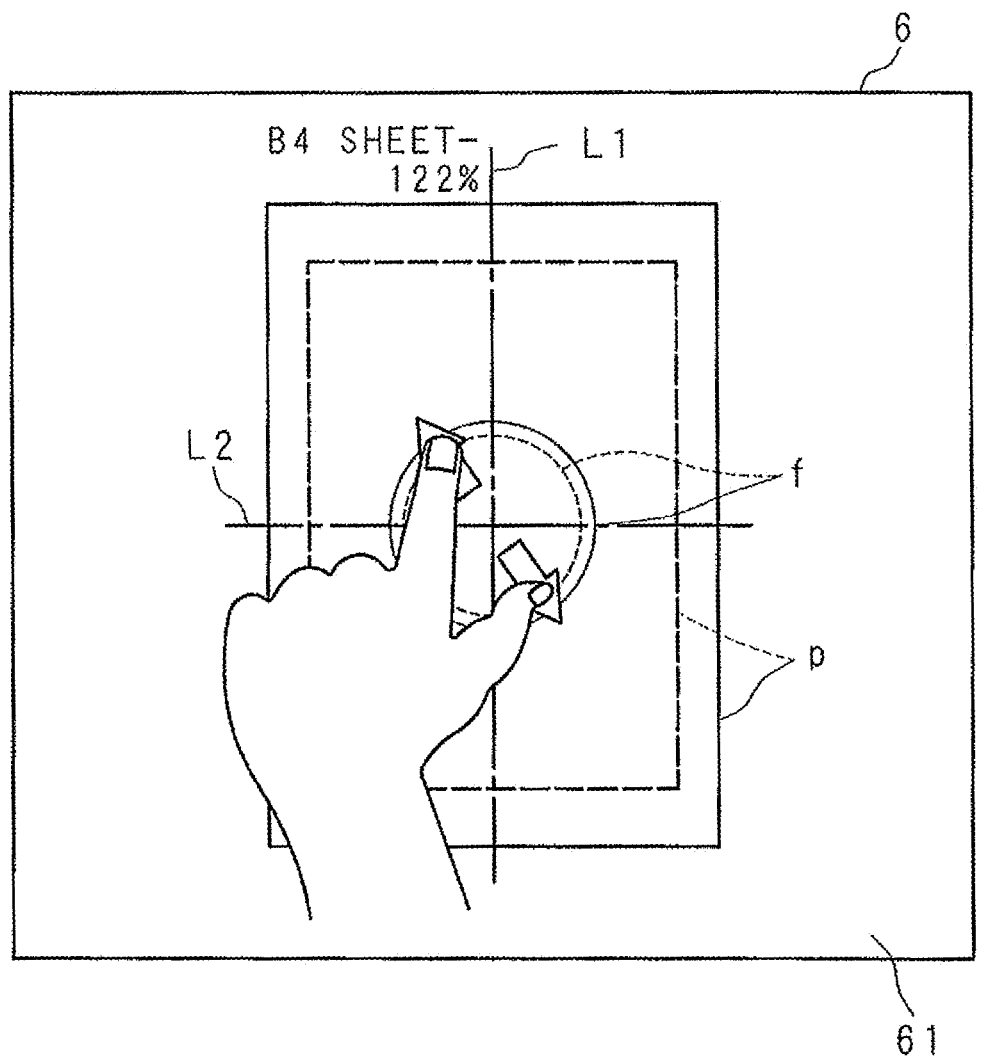
FIG. 16 is an explanatory diagram for describing a case where both of a sheet image and an object image are edited in the multi-function peripheral according to Embodiment 2 of the present invention.

FIGS. 15 and 16 are explanatory diagrams for describing a case where both of the sheet image p and object image f are edited in the multi-function peripheral 100 according to Embodiment 2 of the present invention.

For example, when the user performs a pinch-in operation by moving his or her thumb and forefinger in a direction indicated by the arrows as illustrated in FIG. 15, both of the sheet image p and the object image f are reduced in size. In this case, as illustrated in FIG. 15, the information display section 16 displays, on the display section 6, information concerning a recording sheet that replaces a previous recording sheet due to the pinch-in operation (i.e., the recording sheet decided by the sheet deciding section 15), and a scaling factor for editing of the object image f. In FIG. 15, a text indicating, instead of the A4 sheet selected in Step S205, the "B5 sheet" that is a recording sheet having a smaller size is displayed as the information. Furthermore, the information display section 16 concurrently displays the scaling factor "86%" for the object image f, which is used when the sheet image p is reduced from the size associated with "A4 sheet" to the size associated with "B5 sheet" (see FIG. 9).

On the other hand, when the user performs a pinch-out operation by moving his or her thumb and forefinger in a direction indicated by the arrows as illustrated in FIG. 16, both of the sheet image p and the object image f are increased in size. In this case, as illustrated in FIG. 16, the information display section 16 displays, on the display section 6, information concerning a recording sheet that replaces a previous recording sheet due to the pinch-out operation (i.e., the recording sheet decided by the sheet deciding section 15), and a scaling factor for editing of the object image f. In FIG. 16, a text indicating, instead of the A4 sheet selected in Step S205, the "B4 sheet" that is a recording sheet having a larger size is displayed as the information. Furthermore, the information display section 16 concurrently displays the scaling factor "122%" for the object image f, which is used when the sheet image p is increased from the size associated with "A4 sheet" to the size associated with "B4 sheet" (see FIG. 9).

The above description of Embodiment 2 has been made using an example where editing for enlargement/reduction of the sheet image p is performed and then editing of the object image f is performed in accordance with the editing of the sheet image p, but the present invention is not limited to this example. Alternatively, editing for enlargement/reduction of the object image f may be first performed and then editing of the sheet image p may be performed in accordance with the editing of the object image f.

Note that the configuration of the multi-function peripheral 100 according to the present invention is not limited to the above description. The above description has been made using an example in which when the selection receiving section 14 receives selection of the object image f and the object image f is edited based on a pinch-in or pinch-out operation performed by the user, the scaling factor for the object image f is changed sequentially in accordance with a change in the distance between two points associated with the user's two fingers, but the present invention is not limited to this example. For example, as illustrated in the correspondence table of FIG. 9, the scaling factor for the object image f may be changed in the following order (or reverse order): 141%, 122%, . . . , 81% and 70%.

Components similar to those of the Embodiment 1 are identified by the same reference characters, and the detailed description thereof will be omitted.

Embodiment 3

Figure 17:
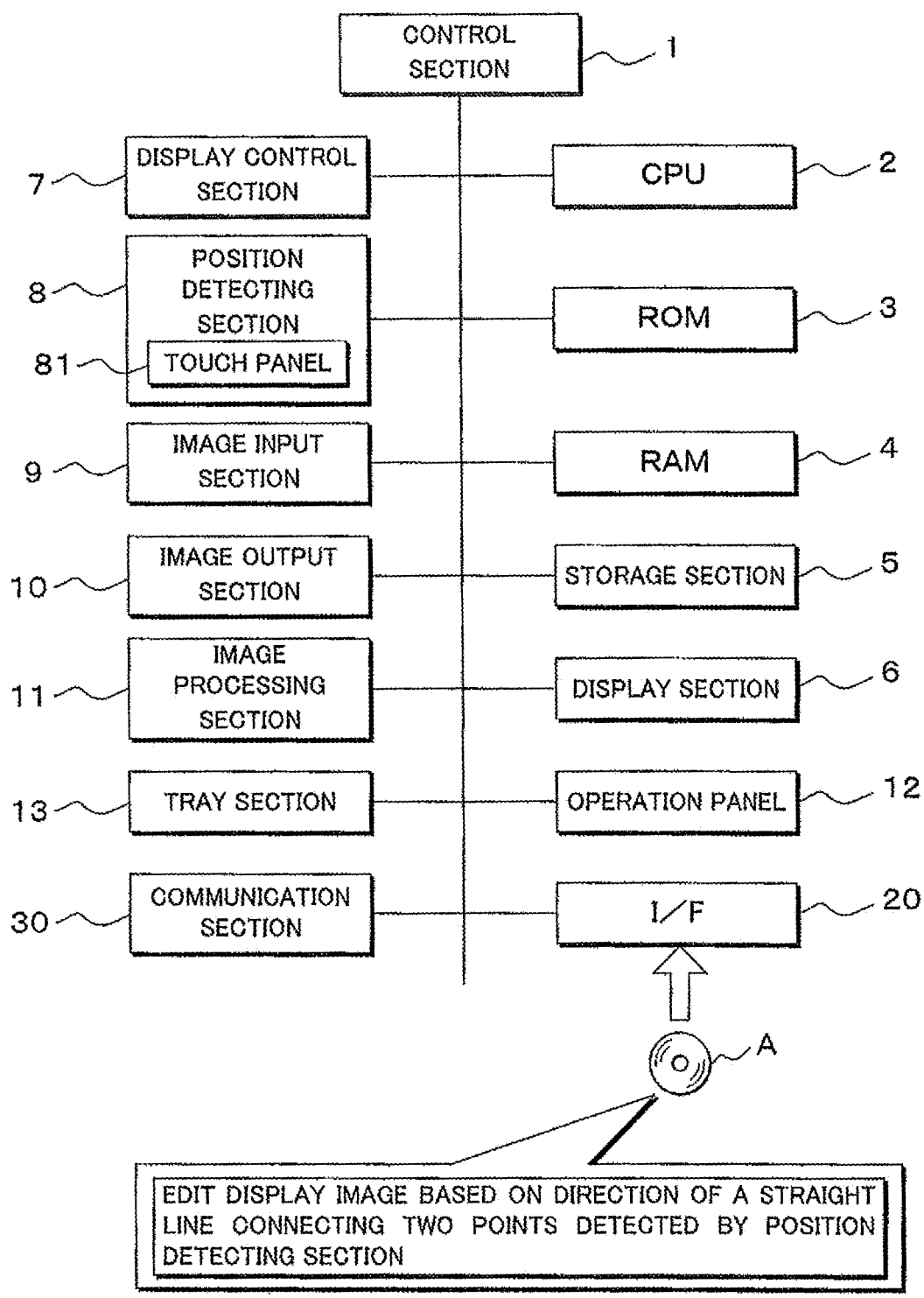
FIG. 17 is a block diagram illustrating main components of a multi-function peripheral according to Embodiment 3 of the present invention.

FIG. 17 is a block diagram illustrating main components of a multi-function peripheral 100 according to Embodiment 3 of the present invention. The multi-function peripheral 100 according to Embodiment 3 is configured so that a computer program for executing an operation may also be provided by using a portable non-transitory computer-readable recording medium A such as a CD-ROM via an I/F 20. Moreover, the multi-function peripheral 100 according to Embodiment 3 is configured so that the computer program may also be downloaded from an unillustrated external device via a communication section 30. Hereinafter, the details of the configuration will be described.

The multi-function peripheral 100 according to Embodiment 3 includes an exterior (or interior) recording medium reader (not illustrated). The portable non-transitory computer-readable recording medium A records a program or the like for editing an image (display image), displayed on the display section 6, based on the direction of a straight line connecting two points detected by the position detecting section 8, and the portable non-transitory computer-readable recording medium A is inserted into the recording medium reader, so that the CPU 2, for example, installs the program on the ROM 3. The program is loaded into the RAM 4 and is executed. Thus, the multi-function peripheral 100 according to Embodiment 3 of the present invention performs its functions.

The non-transitory computer-readable recording medium may be a so-called program medium. Specifically, the non-transitory computer-readable recording medium may be a medium carrying a program code in a fixed manner, and examples thereof may include: tapes such as a magnetic tape and a cassette tape; disks including magnetic disks such as a flexible disk and a hard disk, and optical disks such as a CD-ROM, an MO, an MD and a DVD; cards such as an IC card (including a memory card) and an optical card; and semiconductor memories such as a mask ROM, an EPROM, an EEPROM and a flash ROM.

Alternatively, the non-transitory computer-readable recording medium may be a medium carrying a program code in a state of flux so that a program code is downloaded from a network via the communication section 30. Note that when a program is downloaded from a communication network in this manner, the program to be downloaded may be stored in a main apparatus in advance or may be installed from another non-transitory computer-readable recording medium. It should also be noted that the present invention can also be realized in a form of a computer data signal embedded in a carrier wave, in which the program code is implemented by electronic transmission.

Components similar to those of the Embodiment 1 are identified by the same reference characters, and the detailed description thereof will be omitted.

The above description has been made using an example in which two fingers are used in performing an operation on a single document image to provide an editing instruction such as an instruction for changing a sheet size, an instruction for changing an image size or an instruction for rotating an image, but the present invention is not limited to this example.

For example, when document images of a batch of documents including a plurality of pages are read, a result of editing performed in response to an editing instruction for a given document image may be reflected on all the document images. Alternatively, the result may be reflected only on the document image(s) of selected specific page(s). Moreover, the user may be allowed to select either one of the above functions.

In this case, the multi-function peripheral according to the present invention may be provided with a key for receiving, from the user, an instruction by which an editing instruction for the document image(s) of selected specific page(s) is also reflected on the other document image(s), thus implementing the above functions.

Furthermore, the multi-function peripheral according to the present invention is not limited to the above description, but may be used in conjunction with operation keys for conventional enlargement, reduction, sheet size selection and rotation functions, for example. In addition, an instruction may also be provided in combination with the other editing function.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing method for processing a display image by using an image forming apparatus including a display screen, and a position detector that detects a position of contact with the display screen, and that forms an image on a recording medium based on the display image displayed on the display screen, the method comprising:
- displaying on the display screen an image including an object image indicative of an object for an image formation, and a medium image indicative of the recording medium;
- changing to an edit mode in response to a contact with the display screen detected by the position detector;
- while in the edit mode, modifying magnification of the object image with respect to the medium image, without modifying the medium image, based on contact positions of two points detected by the position detector;
- displaying in the medium image on the display screen an area occupied by the object image modified by the modifying; and
- selecting one recording medium of a plurality of selectable recording mediums based on the contact positions detected by the position detector.

2. The image processing method according to claim 1, wherein
the magnification is modified based on a change in distance between the two points detected by the position detector.

3. An image processing method for processing a display image by using an image processing apparatus including a display screen, and a position detector that detects a position of contact with the display screen, and that forms an image on a recording medium based on the display image displayed on the display screen, the method comprising:
- displaying on the display screen an image including an object image indicative of an object for an image formation, and a medium image indicative of the recording medium;
- changing to an edit mode in response to a contact with the display screen detected by the position detector;
- while in the edit mode, modifying magnification of the object image with respect to the medium image, without modifying the medium image, based on contact positions of two points detected by the position detector;
- displaying an area occupied by the object image modified by the modifying; and
- selecting the recording medium based on the contact positions detected by the position detector.

4. The image processing method according to claim 3, wherein
the magnification is modified based on a change in distance between the two points detected by the position detector.

* * * * *